(12) United States Patent
Takahashi et al.

(10) Patent No.: US 10,958,998 B2
(45) Date of Patent: Mar. 23, 2021

(54) SOUND OUTPUT DEVICE

(71) Applicant: YAMAHA CORPORATION, Hamamatsu (JP)

(72) Inventors: Kunito Takahashi, Hamamatsu (JP); Akiyoshi Sato, Hamamatsu (JP); Tsuyoshi Okami, Hamamatsu (JP)

(73) Assignee: YAMAHA CORPORATION, Hamamatsu (JP)

( * ) Notice: Subject to any disclaimer, the term of this patent is extended or adjusted under 35 U.S.C. 154(b) by 0 days.

(21) Appl. No.: 16/988,073

(22) Filed: Aug. 7, 2020

(65) Prior Publication Data

US 2020/0366980 A1 Nov. 19, 2020

Related U.S. Application Data

(60) Division of application No. 15/861,841, filed on Jan. 4, 2018, now Pat. No. 10,820,076, which is a
(Continued)

(30) Foreign Application Priority Data

Aug. 4, 2015 (JP) .............................. JP2015-154442

(51) Int. Cl.
*H04R 1/28* (2006.01)
*H04R 1/02* (2006.01)
(Continued)

(52) U.S. Cl.
CPC .......... *H04R 1/025* (2013.01); *B60R 11/0217* (2013.01); *H04R 1/345* (2013.01); *H04R 1/2873* (2013.01); *H04R 2499/13* (2013.01)

(58) Field of Classification Search
CPC ...... H04R 1/28; H04R 1/2869; H04R 1/2873; H04R 1/2876; H04R 1/02; H04R 1/025; H04R 1/026
(Continued)

(56) References Cited

U.S. PATENT DOCUMENTS 6,526,150 B2 * 2/2003 Kelly ..................... H04M 1/20
                                                              381/353
6,741,717 B2    5/2004 Dedieu
(Continued)

FOREIGN PATENT DOCUMENTS

CN    1467112 A    1/2004
CN    1585561 A    2/2005
(Continued)

OTHER PUBLICATIONS

International Search Report issued in Intl. Appln No. PCT/JP2016/053668 dated Mar. 29, 2016. English translation provided.
(Continued)

*Primary Examiner* — Suhan Ni
(74) *Attorney, Agent, or Firm* — Rossi, Kimms & McDowell LLP

(57) ABSTRACT

A sound output device includes: a speaker unit that has a sound emitting portion; an attaching member by which the speaker unit is attached to an object; a separating member that is provided between the speaker unit and the attaching member to separate the speaker unit from the attaching member; and a sealing member that is provided between the speaker unit and the attaching member to reduce a sound that is emitted from a side of the speaker unit opposite to the sound emitting portion and is transmitted to a sound emitting portion side. The attaching member has a first portion on a side of the sound emitting portion of the speaker unit, and the first portion of the attaching member has an opening that corresponds to the sound emitting portion.

3 Claims, 17 Drawing Sheets

Related U.S. Application Data continuation of application No. PCT/JP2016/053668, filed on Feb. 8, 2016.

(51) Int. Cl.
*B60R 11/02* (2006.01)
*H04R 1/34* (2006.01)

(58) Field of Classification Search
USPC .................. 381/347, 353–354, 386, 392
See application file for complete search history.

(56) References Cited

U.S. PATENT DOCUMENTS

| | | | |
|---|---|---|---|
| 8,103,034 | B2 | 1/2012 | Tai |
| 2003/0226712 | A1 | 12/2003 | Nishikawa |
| 2005/0041829 | A1 | 2/2005 | Abe |
| 2005/0194202 | A1 | 9/2005 | Ito |
| 2009/0136075 | A1 | 5/2009 | Meyer |
| 2015/0027803 | A1 | 1/2015 | Boyce |
| 2016/0088141 | A1 | 3/2016 | Tamura |

FOREIGN PATENT DOCUMENTS

| | | |
|---|---|---|
| JP | H10210582 A | 8/1998 |
| JP | H10243487 A | 9/1998 |
| JP | H11342800 A | 12/1999 |
| JP | 2004009924 A | 1/2004 |
| JP | 2005219515 A | 8/2005 |
| JP | 2008193502 A | 8/2008 |
| JP | 2011111056 A | 6/2011 |
| WO | 2014203380 A1 | 12/2014 |

OTHER PUBLICATIONS

Written Opinion issued in Intl. Appln. No. PCT/JP2016/053668 dated Mar. 29, 2016.

Office Action issued in Chinese Appln. No. 201680045609.8 dated Jan. 24, 2019. English translation provided.

Office Action issued in Chinese Appln. No. 201680045609.8 dated Sep. 10, 2019. English translation provided.

Office Action issued in Chinese Appln. No. 201680045609.8 dated Mar. 19, 2020. English translation provided.

Office Action issued in U.S. Appl. No. 15/861,841 dated Apr. 4, 2019.

Office Action issued in U.S. Appl. No. 15/861,841 dated Oct. 18, 2019.

Office Action issued in U.S. Appl. No. 15/861,841 dated Mar. 5, 2020.

Notice of Allowance issued in U.S. Appl. No. 15/861,841 dated Jun. 24, 2020.

\* cited by examiner

SOUND OUTPUT DEVICE

BACKGROUND OF THE INVENTION

Field of the Invention

The present invention concerns technology relating to a sound output device.

Description of the Related Art

In a system that facilitates a hands-free call in a car, for example, a loudspeaker that has a built-in speaker unit and microphone is directly attached to the interior of the car (e.g., WO 2014/203380 A1).

According to the technology described in WO 2014/203380 A1, however, since the loudspeaker is directly attached to the interior of the car, when a user makes a hands-free call, vibrations generated by the loudspeaker attached to the car's interior in turn vibrate the interior, in some cases resulting in noise.

SUMMARY OF THE INVENTION

The present invention is created in view of the above circumstances and an object of the invention is to provide a sound output device capable of reducing vibrations of the interior due to vibrations generated by a loudspeaker.

In order to achieve the above-mentioned objective, a sound output device according to a first aspect of the present invention includes: a speaker unit that has a sound emitting portion; an attaching member by which the speaker unit is attached to an object; a separating member that is provided between the speaker unit and the attaching member to separate the speaker unit from the attaching member; and a sealing member that is provided between the speaker unit and the attaching member to reduce a sound that is emitted from a side of the speaker unit opposite to the sound emitting portion and is transmitted to a sound emitting portion side. The attaching member has a first portion on a side of the sound emitting portion of the speaker unit, and the first portion of the attaching member has an opening that corresponds to the sound emitting portion. One end of the separating member is attached to the speaker unit and the other end of the separating member is attached to the attaching member, and one end of the sealing member is attached to the speaker unit and the other end of the sealing member is attached to the attaching member.

A sound output device according to a second aspect of the present invention includes: a speaker unit that has a sound emitting portion; an attaching member by which the speaker unit is attached to an object; and a separating member that is provided between the speaker unit and the attaching member to separate the speaker unit from the attaching member. The separating member reduces a sound that is emitted from a side of the speaker unit opposite to the sound emitting portion and is transmitted to a sound emitting portion side. One end of the separating member is attached to the speaker unit and the other end of the separating member is attached to the attaching member. The attaching member has a first portion on a side of the sound emitting portion of the speaker unit, and the first portion of the attaching member has an opening that corresponds to the sound emitting portion.

A sound output device according to a third aspect of the present invention includes: a chassis that houses a speaker unit that has a sound emitting portion; an attaching member by which the chassis is attached to an object; and separating members that are provided between the chassis and the attaching member to separate the chassis from the attaching member. The chassis has a first portion on a side of the sound emitting portion of the speaker unit, the attaching member has a first portion on a side of the sound emitting portion of the speaker unit, and the first portion of the chassis and the first portion of the attaching member each have an opening that corresponds to the sound emitting portion.

DESCRIPTION OF THE EMBODIMENTS

In the following, embodiments of the invention are described with reference to accompanying drawings.

First Embodiment

Figure 1:
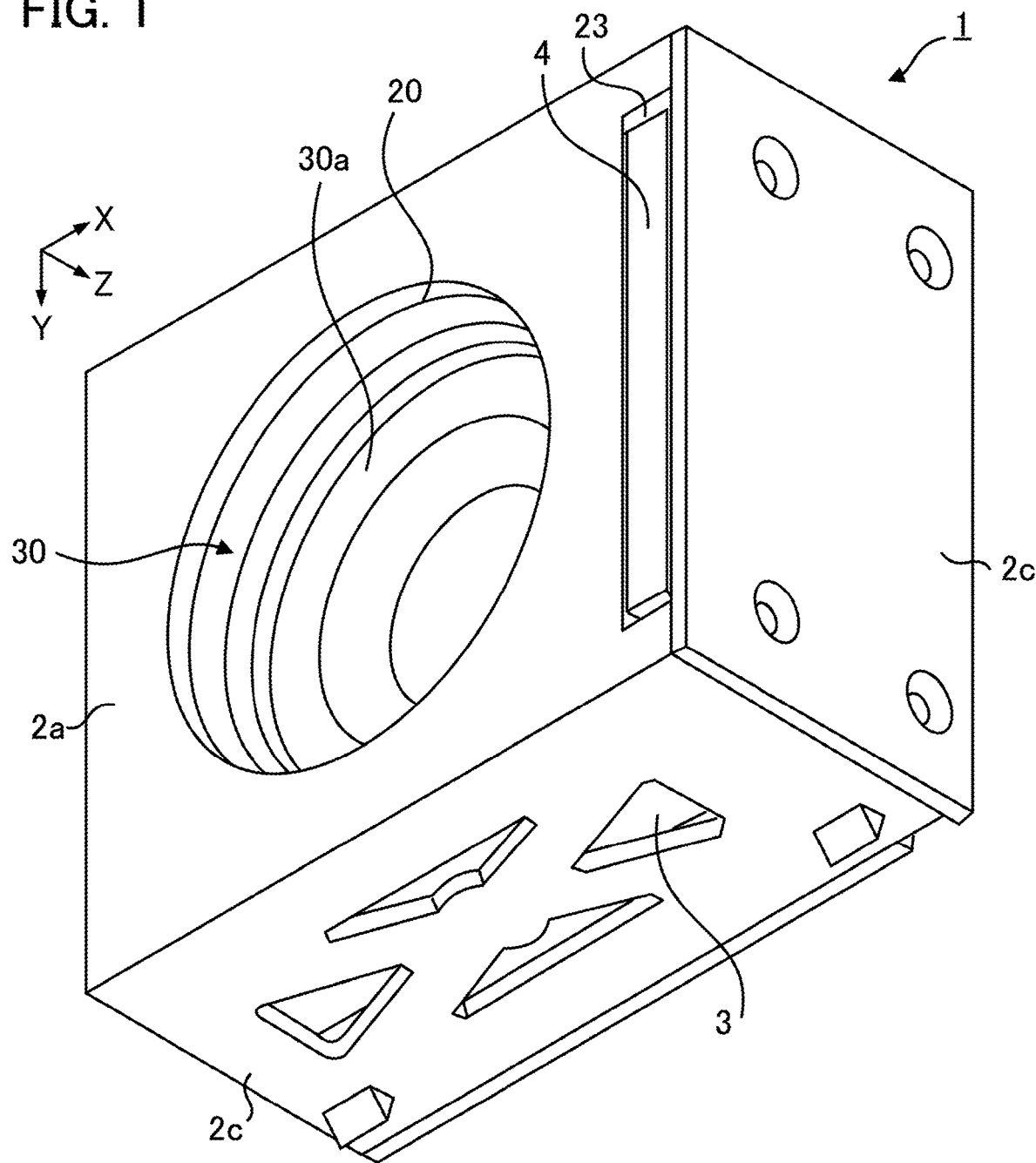
FIG. 1 is a perspective view showing a schematic configuration of a sound output device 1 according to a first embodiment.
Figure 2A:
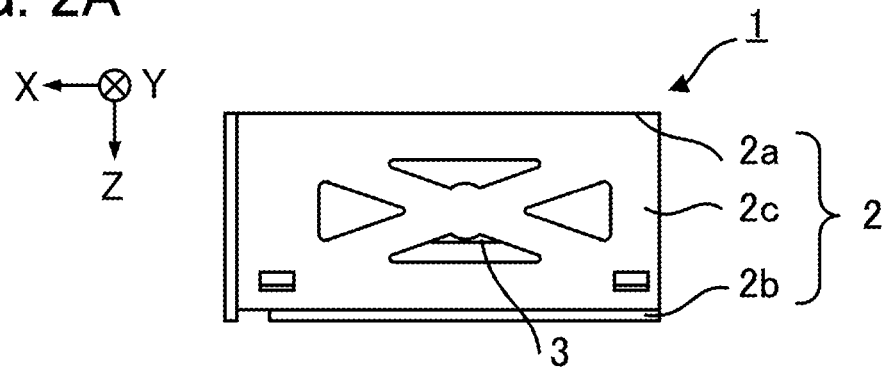
FIG. 2A is a schematic view of the back of the sound output device 1 according to the first embodiment.
Figure 2B:
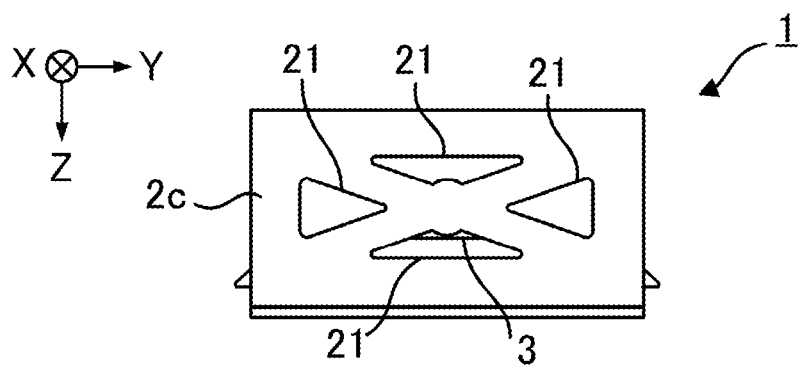
FIG. 2B is a schematic view of the left side of the sound output device 1.
Figure 2C:
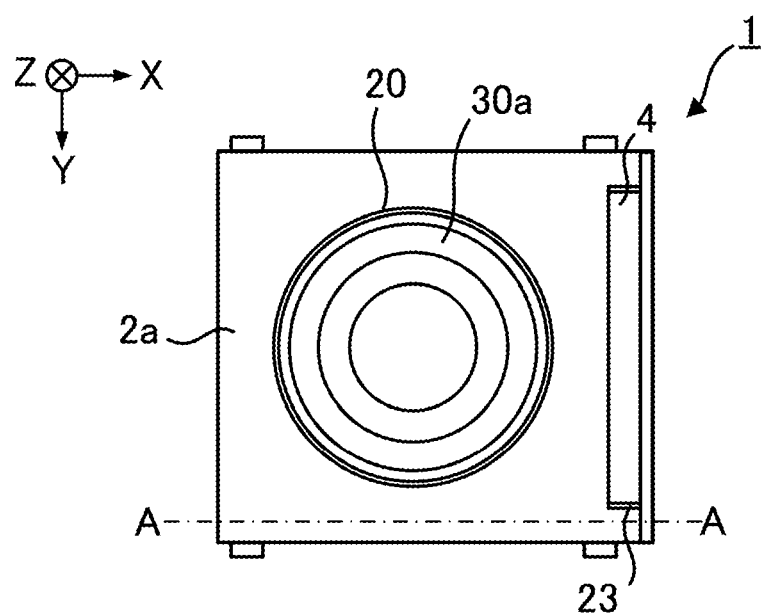
FIG. 2C is a schematic view of the top of the sound output device 1.
Figure 2D:
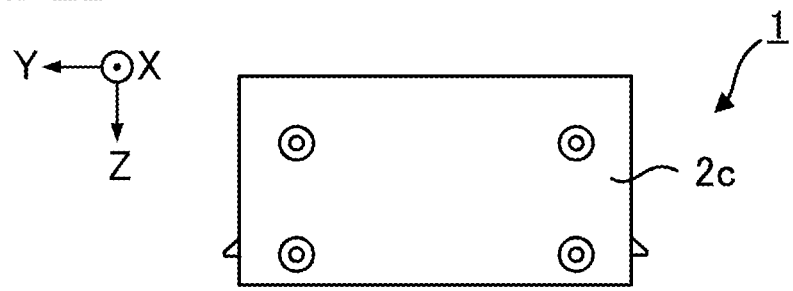
FIG. 2D is a schematic view of the right side of the sound output device 1.
Figure 2E:
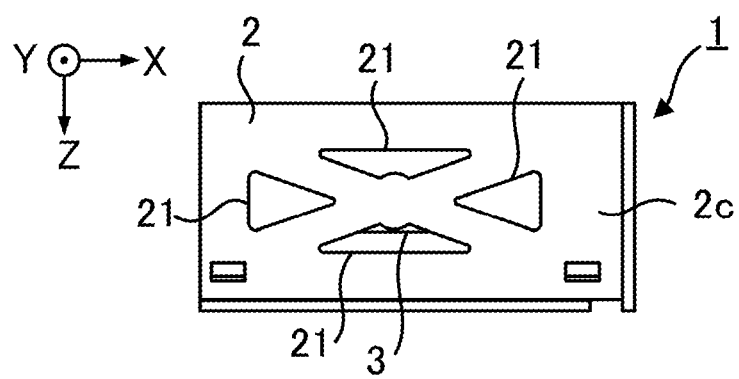
FIG. 2E is a schematic view of the front of the sound output device 1.
Figure 2F:
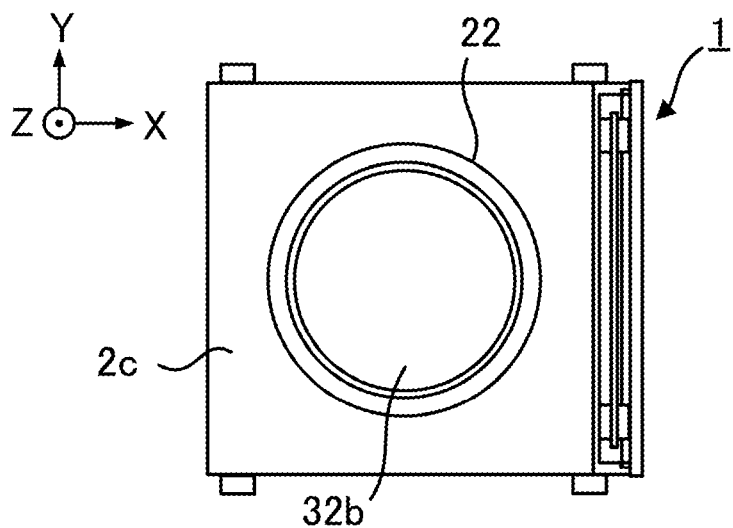
FIG. 2F is a schematic view of the base of the sound output device 1.

FIG. 1 is a perspective view showing a schematic configuration of a sound output device 1 according to a first embodiment. FIGS. 2A to 2F show a schematic configuration of the sound output device 1 according to the first embodiment. Of the sound output device 1, FIG. 2A shows a back view, FIG. 2B shows a left side view, FIG. 2C shows a top view, FIG. 2D shows a right side view, FIG. 2E shows a front view, and FIG. 2F shows a base view. As shown in these figures, the sound output device 1 includes an outer box 2 (attaching member), a loudspeaker 3, and a microphone 4. The loudspeaker 3 includes a speaker unit 30 that has a sound emitting portion 30a and an inner box 32 (chassis) that houses the speaker unit 30 (detailed configuration of the loudspeaker 3 is described later). The speaker unit 30 emits sounds in accordance with supplied audio signals. The sound emitting portion 30a is a portion (e.g., diaphragm), of the speaker unit 30, that vibrates in accordance with audio signals to generate sounds.

As shown in these figures, an X-Y plane that includes the rim of the sound emitting portion 30a of the speaker unit 30 (hereinafter, may be referred to as a sound emitting plane) and a Z-axis perpendicular to the X-Y plane are assumed. The Z-axis direction corresponds to the central-axis direction of the speaker unit 30. A rear portion 30b of the speaker unit 30, which is on the side opposite to the sound emitting portion 30a, is on the positive side relative to the sound emitting portion 30a in the Z-axis direction. A portion of the speaker unit 30 other than the sound emitting portion 30a and the rear portion 30b is referred to as a sidewall 30c of the speaker unit 30.

The outer box 2 has a front board 2a, a back board 2b, and multiple (four pieces of) side boards 2c. The front board 2a, the back board 2b, and the side boards 2c are each a substantially rectangular tabular member. The four side boards 2c are disposed, between the mutually facing front board 2a and back board 2b, along the sides of the front board 2a and those of the back board 2b to form the hollow cuboidal outer box 2. The front board 2a and the back board 2b are each parallel to the sound emitting plane, and the side boards 2c are parallel to the Z-axis. The front board 2a is on the negative side relative to the back board 2b in the Z-axis direction. The front board 2a (first portion of the attaching member) is provided on a side of the sound emitting portion 30a of the speaker unit 30. In the front board 2a, an opening 20 is formed that exposes the sound emitting portion 30a of the speaker unit 30 and corresponds to the shape of the sound emitting portion 30a. The back board 2b (second portion of the attaching member) is provided on a side of the rear portion 30b of the speaker unit 30. In the back board 2b, an opening 22 is formed that exposes part of the back portion 32b of the inner box 32 and corresponds to the shape of the back portion 32b. The side boards 2c (third portion of the attaching member) are provided on a side of the sidewall 30c of the speaker unit 30. In the side boards 2c, multiple openings 21 are formed.

A recessed portion 23 is formed on the outer surface of the front board 2a of the outer box 2 (the surface opposite the surface that is on a back board 2b side), and the microphone 4 is placed in the recessed portion 23. The microphone 4 is, for example, an MEMS (Micro-Electrical-Mechanical Systems) microphone. It is not essential for the sound output device 1 in this embodiment to include the microphone 4.

The sound output device 1 is attached to a freely chosen object, such as the interior of a car. More specifically, the sound output device 1 is attached to the interior of a car such that the outer surface of the front board 2a of the outer box 2, in which board the opening 20 is formed, faces the back side of the interior. In this way, the sound emitting portion 30a of the speaker unit 30 faces toward the inside of the car. In other words, the outer box 2 serves as an attaching member that attaches the inner box 32 to an object. An object to which the inner box 32 is attached may be, for example, the ceiling of the car's interior (e.g., a part near a room lamp and/or a map lamp), a dashboard, or a door.

In this and the following embodiments, it is assumed that the outer box 2 has multiple boards (the front board 2a, the back board 2b, and the side boards 2c) that are formed separately. However, some parts of the outer box 2 (e.g., the front board 2a and the side boards 2c) may be formed as one body.

Figure 3A:
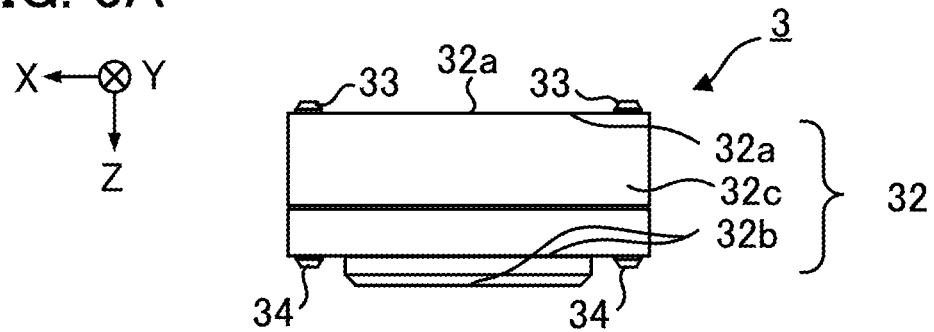
FIG. 3A is a schematic view of the back of a loudspeaker 3 according to the first embodiment.
Figure 3B:
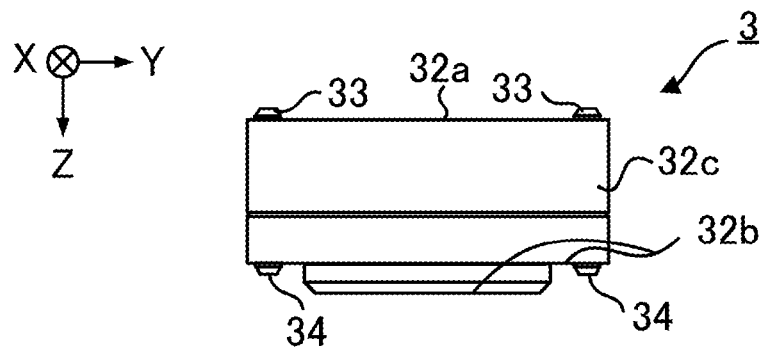
FIG. 3B is a schematic view of the left side of the loudspeaker 3.
Figure 3C:
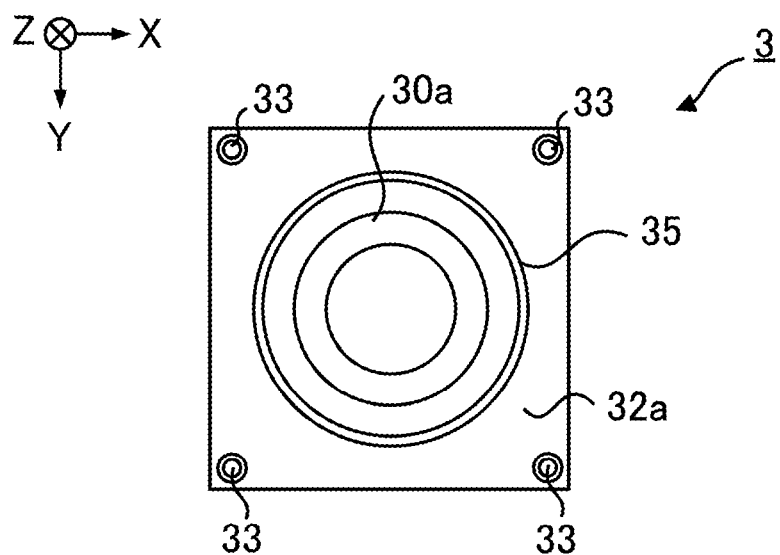
FIG. 3C is a schematic view of the top of the loudspeaker 3.
Figure 3D:
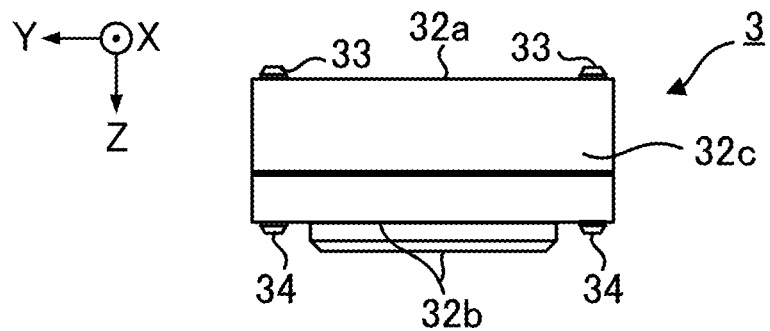
FIG. 3D is a schematic view of the right side of the loudspeaker 3.
Figure 3E:
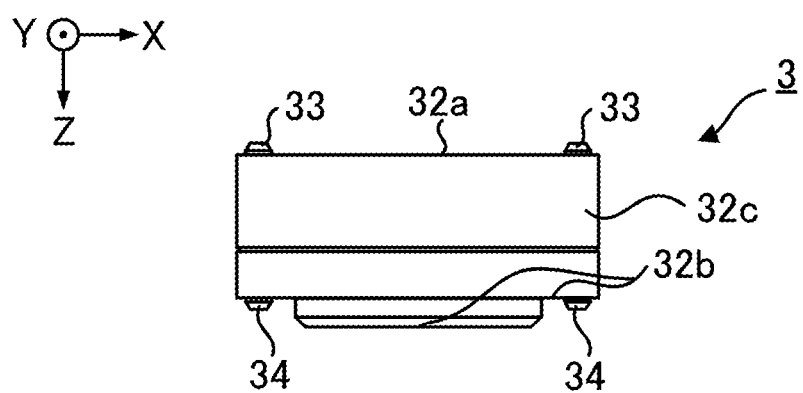
FIG. 3E is a schematic view of the front of the loudspeaker 3.
Figure 3F:
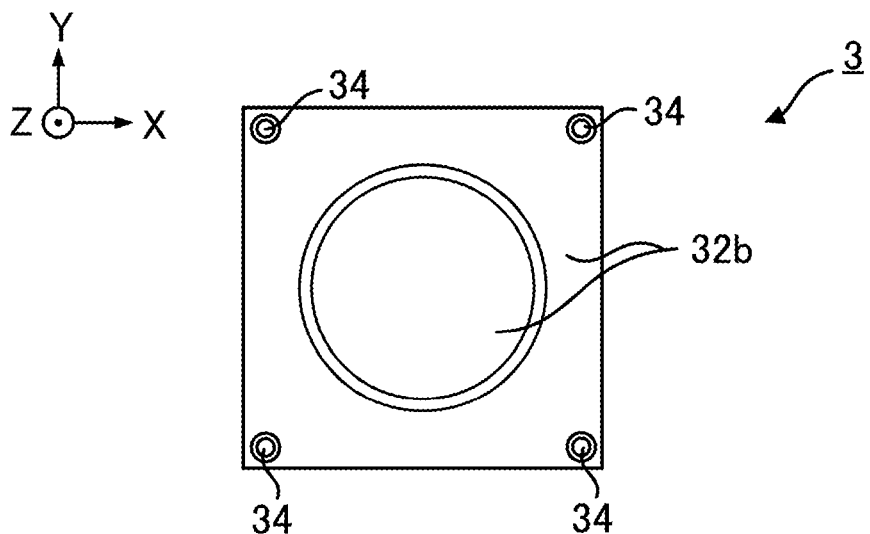
FIG. 3F is a schematic view of the base of the loudspeaker 3.
Figure 4:
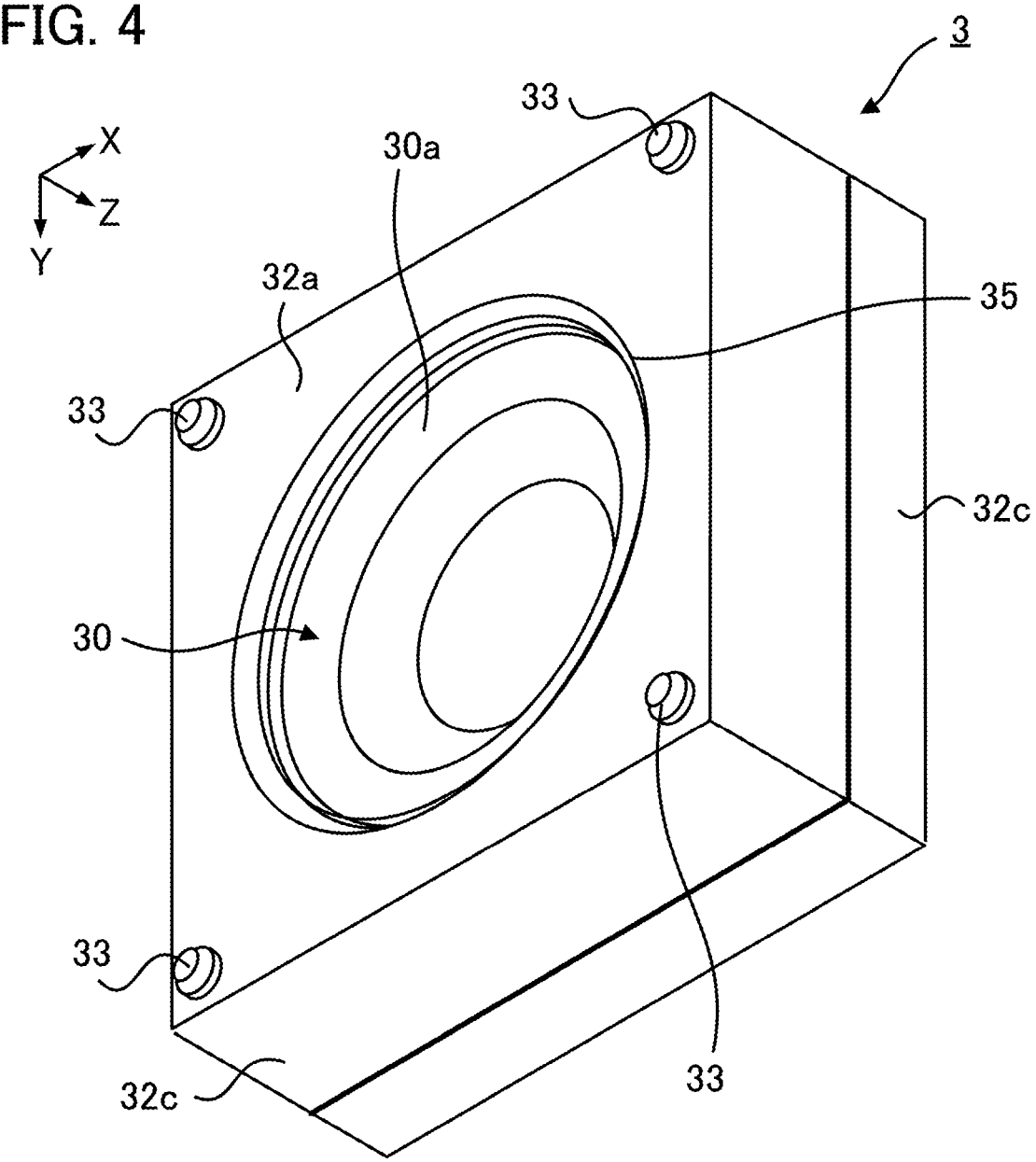
FIG. 4 is a perspective view showing a schematic configuration of the loudspeaker 3 according to the first embodiment.

FIGS. 3A to 3F show a schematic configuration of the loudspeaker 3 in the first embodiment. Of the loudspeaker 3, FIG. 3A shows a back view, FIG. 3B shows a left side view, FIG. 3C shows a top view, FIG. 3D shows a right side view, FIG. 3E shows a front view, and FIG. 3F shows a base view. FIG. 4 is a perspective view showing a schematic configuration of the loudspeaker 3 in the first embodiment. As shown in these figures, the loudspeaker 3 includes the speaker unit 30 and the inner box 32 (chassis) that houses the speaker unit 30.

Figure 7A:
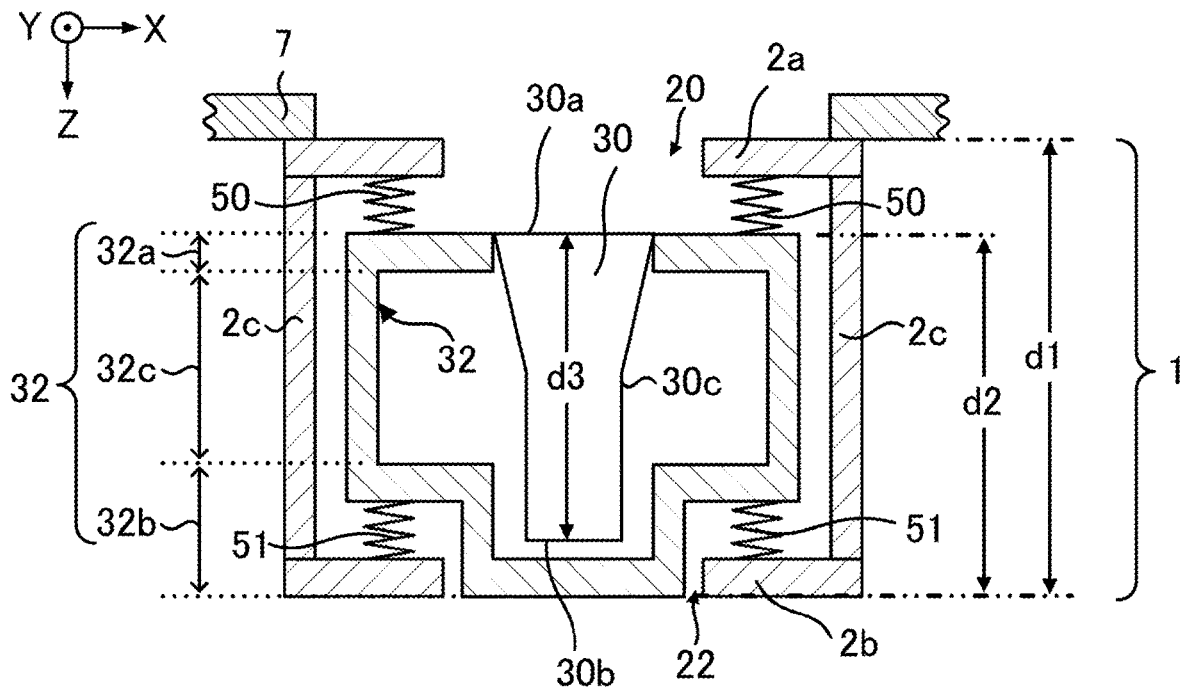
FIG. 7A is a schematic diagram of the sound output device 1 according to the first embodiment.

FIG. 7A is a schematic diagram showing an example of a cross-section of the sound output device 1 when the sound output device 1 is viewed from the positive Y-axis side. As is understood from FIG. 7A, the inner box 32 has a boxlike portion and a cylindrical portion that protrudes from the boxlike portion toward the positive Z-axis direction. The speaker unit 30 is disposed inside the inner box 32, across from the boxlike portion to the cylindrical portion. The inner box 32 has a front portion 32a, a back portion 32b, and a side portion 32c. The front portion 32a is a portion on a side of the sound emitting portion 30a of the speaker unit 30; i.e., a part of the boxlike portion on a sound emitting portion 30a side. The back portion 32b is a portion on a side of the rear portion 30b of the speaker unit 30. The back portion 32b includes a part of the boxlike portion on a rear portion 30b side and the cylindrical portion. The side portion 32c is a portion other than the front portion 32a and the back portion 32b, the portion being on a side of the sidewall 30c of the speaker unit 30. That is, the side portion 32c is a lateral part of the boxlike portion. Each of the part of the boxlike portion on the sound emitting portion 30a side and the part of the boxlike portion on the rear portion 30b side is parallel to the sound emitting plane, and the lateral part of the boxlike portion is parallel to the central axis of the speaker unit 30.

The outer surface (the surface on the negative Z-axis side) of the front portion 32a of the inner box 32 is arranged on substantially the same plane as the sound emitting plane. The outer surface (the surface on the positive Z-axis side) of the base of the cylindrical portion of the back portion 32b of the inner box 32 is arranged on substantially the same plane as the outer surface (the surface on the positive Z-axis side) of the back board 2b of the outer box 2. The front portion 32a of the inner box 32 is provided on the positive Z-axis side relative to the front board 2a of the outer box 2. Of the back portion 32b of the inner box 32, the part of the boxlike portion on the rear portion 30b side is provided on the negative Z-axis side relative to the back board 2b of the outer box 2.

As shown in FIGS. 3A to 3F and FIG. 4, holding parts 33 each having, for example, a convex shape are formed on the four corners of the outer surface of the front portion 32a of the inner box 32 (the surface facing the front board 2a of the outer box 2). Holding parts 34 each having, for example, a convex shape are formed on the four corners of the outer surface of the back portion 32b of the inner box 32 (the surface facing the back board 2b of the outer box 2). That is, the holding parts 34 are formed on the four corners of the outer surface of the part of the boxlike portion of the inner box 32 on the rear portion 30b side. As shown in FIG. 3C, in the front portion 32a of the inner box 32 (first portion of the chassis), there is formed an opening 35 that exposes the sound emitting portion 30a of the speaker unit 30 and corresponds to the shape of the sound emitting portion 30a.

The parts of the inner box 32 (the front portion 32a, the back portion 32b, and the side portion 32c) may be formed separately and then assembled, or some parts of the inner box 32 (e.g., the front portion 32a and the side portion 32c) may be formed as one body.

Figure 5A:
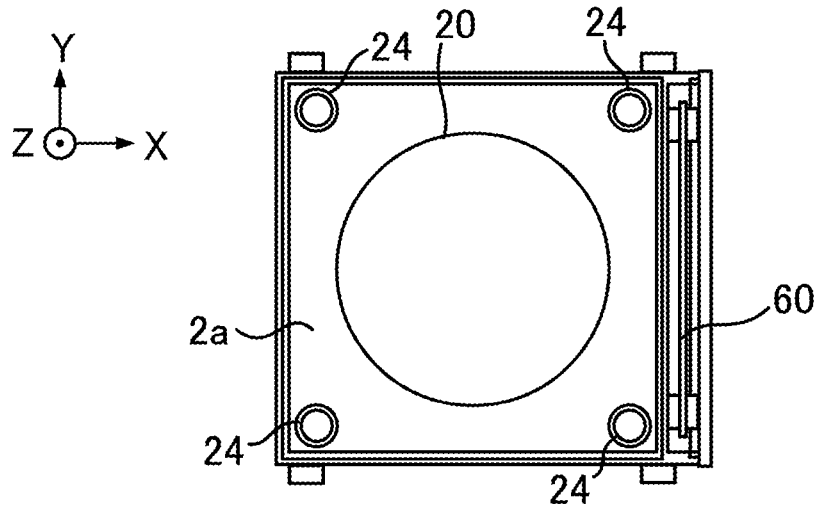
FIG. 5A is an illustration showing a front board of an outer box 2 viewed from a back board side.
Figure 5B:
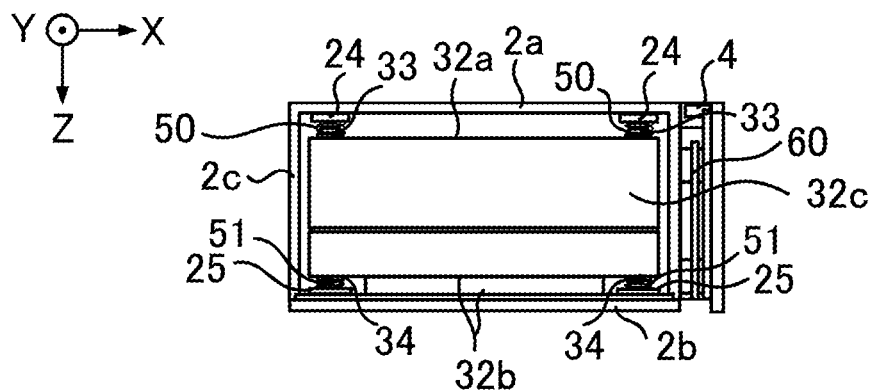
FIG. 5B is a cross-sectional view along line A-A shown in FIG. 2C.
Figure 5C:
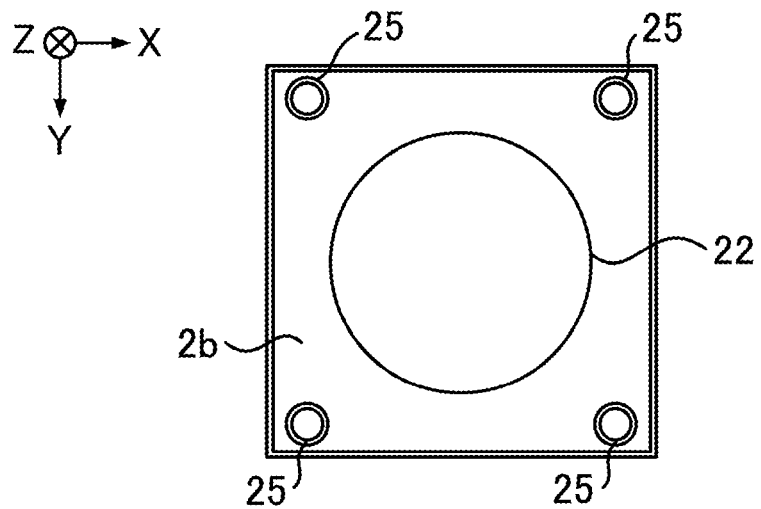
FIG. 5C is an illustration showing the back board of the outer box 2 viewed from a front board side.
Figure 6:
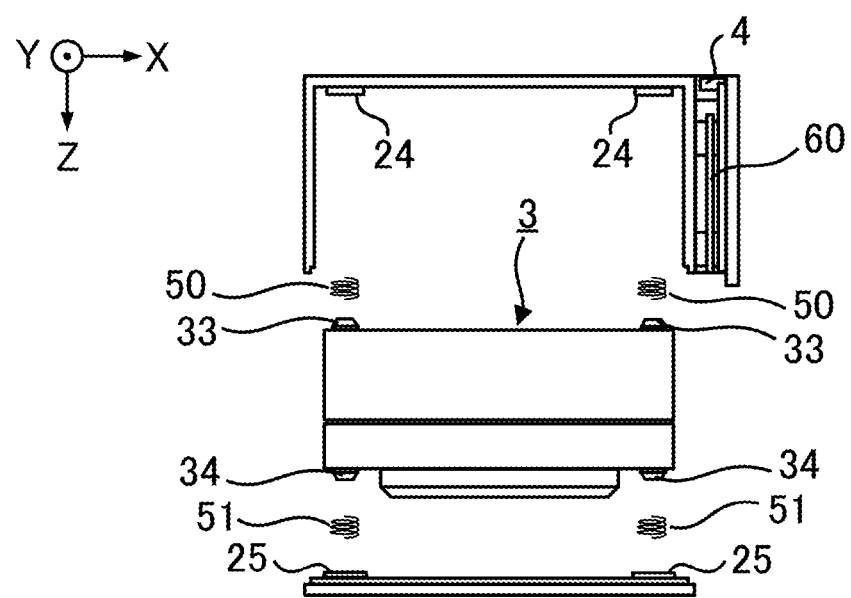
FIG. 6 is an exploded view of the view shown in FIG. 5B.

FIG. 5A is an illustration showing the inner surface (the surface on an inner box 32 side) of the front board 2a of the outer box 2. FIG. 5C is an illustration showing the inner surface (the surface on a side of the boxlike portion of the inner box 32) of the back board 2b of the outer box 2. As shown in these figures, holding parts 24 each having, for example, a concave shape are formed on the four corners of the inner surface of the front board 2a, and holding parts 25 each having, for example, a concave shape are formed on the four corners of the inner surface of the back board 2b. FIG. 5B is a cross-sectional view along line A-A shown in FIG. 2C from the positive Y-axis side. FIG. 6 is an exploded view, along the Z-axis, of the cross-section shown in FIG. 5B.

As shown in FIG. 5B and FIG. 6, vibration dampers 50 (separating members) lie between the holding parts 33 and the holding parts 24, with the holding parts 33 being formed on the outer surface of the front portion 32a of the inner box 32 of the loudspeaker 3, and the holding parts 24 being formed on the inner surface of the front board 2a of the outer box 2. Additionally, vibration dampers 51 (separating members) lie between the holding parts 34 and the holding parts 25, with the holding parts 34 being formed on the outer surface of the back portion 32b of the inner box 32 (more precisely, the part of the boxlike portion of the inner box 32 on the rear portion 30b side), and the holding parts 25 being formed on the inner surface of the back board 2b of the outer box 2. The vibration dampers 50 and 51 are members that lie between the inner box 32 and the outer box 2, separating them to absorb vibrations to the loudspeaker 3. In the following, the description of the holding parts (24, 25, 33, and 34) may be omitted for brevity. For example, the description that "the vibration dampers 50 (or 51) lie between the front board 2a (or the back board 2b) of the outer box 2 and the front portion 32a (or the back portion 32b) of the inner box 32" means that "the vibration dampers 50 (or 51) lie between the holding parts 24 (or 25) on the outer box 2 and the holding parts 33 (or 34) on the inner box 32."

As shown in FIG. 5A and FIG. 5B, inside the outer box 2, there may be provided a signal processing IC 60 that executes sound processing on audio signals provided to the speaker unit 30, such processing including amplification of, or addition of sound effects to, the audio signals.

As shown in FIG. 7A, the vibration dampers 50 are disposed between the front board 2a of the outer box 2 and the front portion 32a of the inner box 32. Accordingly, the front portion 32a of the inner box 32 and the sound emitting portion 30a are disposed behind the front board 2a of the outer box 2. The vibration dampers 51 are disposed between the back portion 32b of the inner box 32 (more precisely, the boxlike portion corresponding to the back portion 32b) and the back board 2b of the outer box 2. Thus, in FIG. 7A, the length d1 of the outer box 2 along the central-axis direction of the speaker unit 30 (Z-axis direction) is greater than the length d3 of the speaker unit 30. More specifically, in the central-axis direction of the speaker unit 30, the front board 2a of the outer box 2 is on the negative Z-axis side relative to the sound emitting portion 30a, and the back board 2b of the outer box 2 is on the positive Z-axis side relative to the rear portion 30b of the speaker unit 30. The length d2 of the inner box 32 is greater than the length d3 of the speaker unit 30. More specifically, in the central-axis direction of the speaker unit 30, the outer surface of the front portion 32a of the inner box 32 is on substantially the same plane as the sound emitting plane, and the base of the cylindrical portion of the back portion 32b of the inner box 32 is on the positive Z-axis side relative to the rear portion 30b of the speaker unit 30.

With the outer box 2 that serves as an attaching member, the sound output device 1 is attached to an object 7, which is, for example, the interior of a car. In FIG. 7A, for the sake of brevity, only a portion of the object 7, to which the sound output device 1 is attached, is illustrated, and the illustration of the holding parts (24, 25, 33, and 34), the microphone 4, the signal processing IC 60, etc. are omitted. Such simplified illustration also applies to FIG. 7B to FIG. 9B.

Figure 7B:
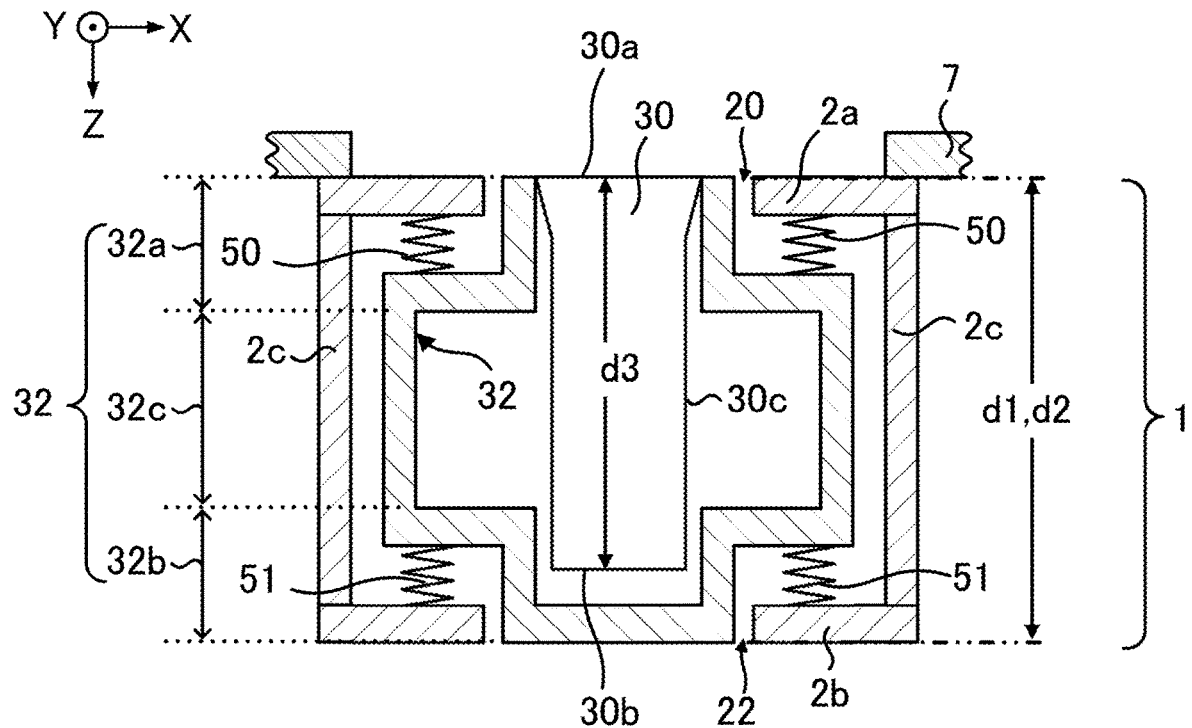
FIG. 7B is another schematic diagram of the sound output device 1 according to the first embodiment.

FIG. 7A schematically shows an exemplary configuration of the sound output device 1. The sound output device 1 according to the first embodiment is not limited to the configuration shown in FIG. 7A. FIG. 7B schematically shows another exemplary configuration of the sound output device 1 according to the first embodiment. In the example shown in FIG. 7B, in addition to the boxlike portion and the first cylindrical portion that protrudes from the boxlike portion toward the positive Z-axis direction, the inner box 32 has a second cylindrical portion that protrudes from the boxlike portion toward the negative Z-axis direction on a side of the sound emitting portion 30a of the speaker unit 30. Here, the second cylindrical portion is treated as part of the front portion 32a of the inner box 32. The speaker unit 30 is disposed inside the inner box 32 across from the second cylindrical portion to the first cylindrical portion through the boxlike portion. The speaker unit 30 is disposed such that the sound emitting plane is on substantially the same plane as the outer surface of the front board 2a of the outer box 2. In this example, as is the case in the exemplary configuration shown in FIG. 7A, the vibration dampers 50 are disposed between the front board 2a of the outer box 2 and the front portion 32a of the inner box 32 (more precisely, the boxlike portion corresponding to the front portion 32a), and the vibration dampers 51 are disposed between the back board 2b of the outer box 2 and the back portion 32b of the inner box 32 (more precisely, the boxlike portion corresponding to the back portion 32b). In the example shown in FIG. 7B, however, the sound output device 1 is configured such that the length d2 of the inner box 32 is substantially equal to the length d1 of the outer box 2. More specifically, the outer surface of the front board 2a of the outer box 2 and the upper-end surface of the second cylindrical portion of the front portion 32a of the inner box 32 are on substantially the same plane. Additionally, the outer surface of the back board 2b of the outer box 2 and the outer surface of the base of the first cylindrical portion of the back portion 32b of the inner box 32 are on substantially the same plane.

In this embodiment, the vibration dampers 50 and 51 are provided both on a side of the front portion 32a and on a side of the back portion 32b of the inner box 32. However, only the vibration dampers 50 on a side of the front portion 32a of the inner box 32 may be provided, or only the vibration dampers 51 on a side of the back portion 32b of the inner box 32 may be provided. In a case in which only the vibration dampers 51 on a side of the back portion 32b of the inner box 32 are provided, there may be provided a predetermined space between the front portion 32a of the inner box 32 and the front board 2a of the outer box 2.

In this embodiment, a coiled spring member is used as an example of a vibration damper 50 or 51. One end of a vibration damper 50 is attached to a holding part 33 formed on the front portion 32a of the inner box 32, and the other end of the vibration damper 50 is attached to a holding part 24 formed on the front board 2a of the outer box 2. One end of a vibration damper 51 is attached to a holding part 34 formed on the back portion 32b of the inner box 32, and the other end of the vibration damper 51 is attached to a holding part 25 formed on the back board 2b of the outer box 2. More specifically, the convex part of a, for example, convex-shaped holding part 33 (or 34) is inserted into one end of a spring member, and the other end of the spring member is inserted into the concave part of a corresponding, for example, concave-shaped holding part 24 (or 25).

Material used for the vibration dampers 50 and 51 is not limited to a spring and may be any material that absorbs vibrations. For a vibration damper, any elastic material other than a spring (e.g., sponge, resin) or any other material (e.g., gel) may be used.

In this embodiment, as described above, the inner box 32 housing the speaker unit 30 is attached to the outer box 2 with the vibration dampers 50 and 51 provided therebetween such that the inner box 32 is separated from the outer box 2. In this way, when the speaker unit 30 generates sounds, vibrations generated by the speaker unit will be absorbed by the vibration dampers 50 and 51. Accordingly, in a case in which the sound output device 1 is attached to an object 7 (e.g., the interior of a car), vibrations (vibrations that the speaker unit 30 generates) that are transmitted to the object 7 are reduced, and consequently, noise generated by the vibrations can be reduced. Moreover, since the vibrations transmitted to the object 7 are reduced, noise that is generated due to the vibrations and is then transmitted to the microphone 4 adjacent to the speaker unit 30 is reduced. Thus, degradation of echo-cancellation performance can be lessened. Furthermore, in this embodiment, the vibration dampers 50 are disposed on the same side as the sound emitting portion 30a. In this way, compared with a case in which only the vibration dampers 51 are disposed on the rear portion 30b side, more remarkable advantageous effects are achieved in reducing the vibrations and hence the noise.

Additionally, in this embodiment, multiple openings 21 are formed in the side boards 2c of the outer box 2, and the opening 22 that exposes part of the back portion 32b of the inner box 32 is formed in the back board 2b of the outer box 2. In this way, even when the inner box 32 deforms due to generation of sound, the pressure of the space between the inner box 32 and the outer box 2 will not increase, and consequently, unnecessary distortion of the outer box 2 can be suppressed.

Modifications of First Embodiment

The sound output device 1 according to the first embodiment can be modified in a variety of ways.

Modification Mode 1

Figure 8A:
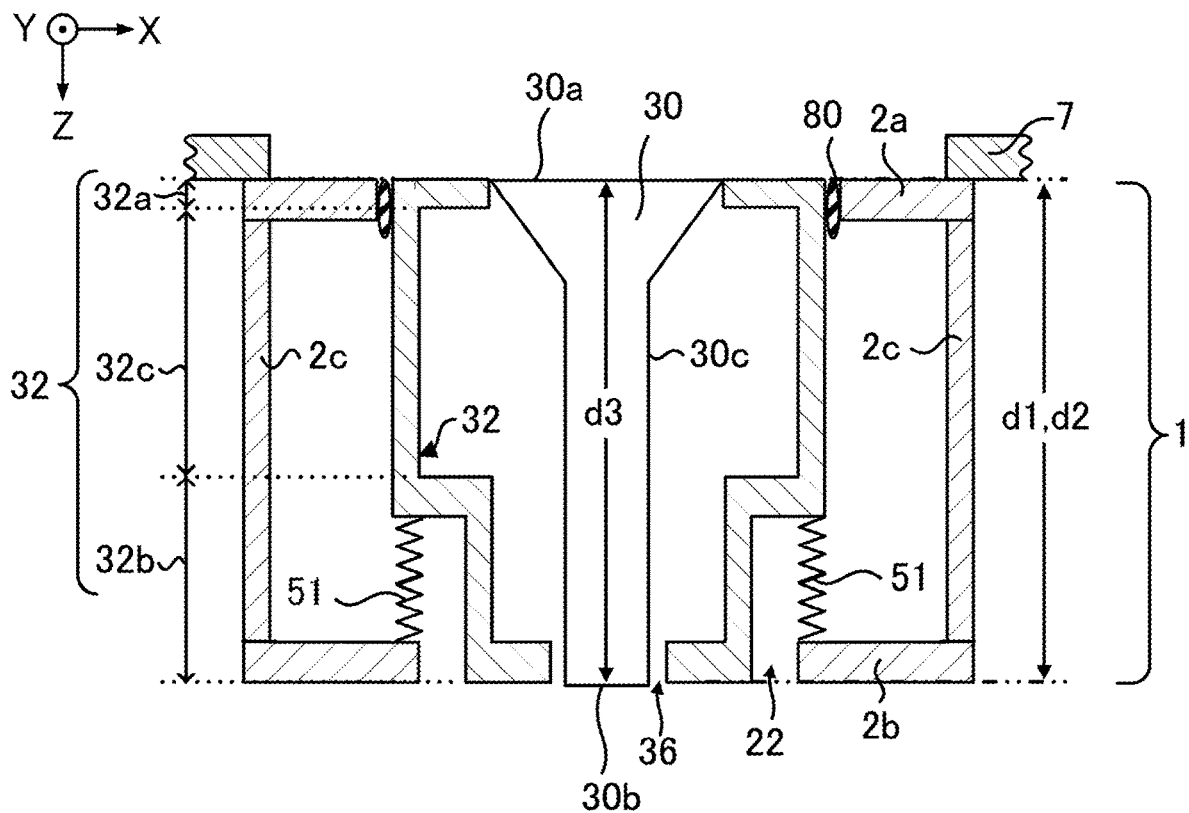
FIG. 8A is a schematic diagram of a sound output device 1 according to modification mode 1.
Figure 8B:
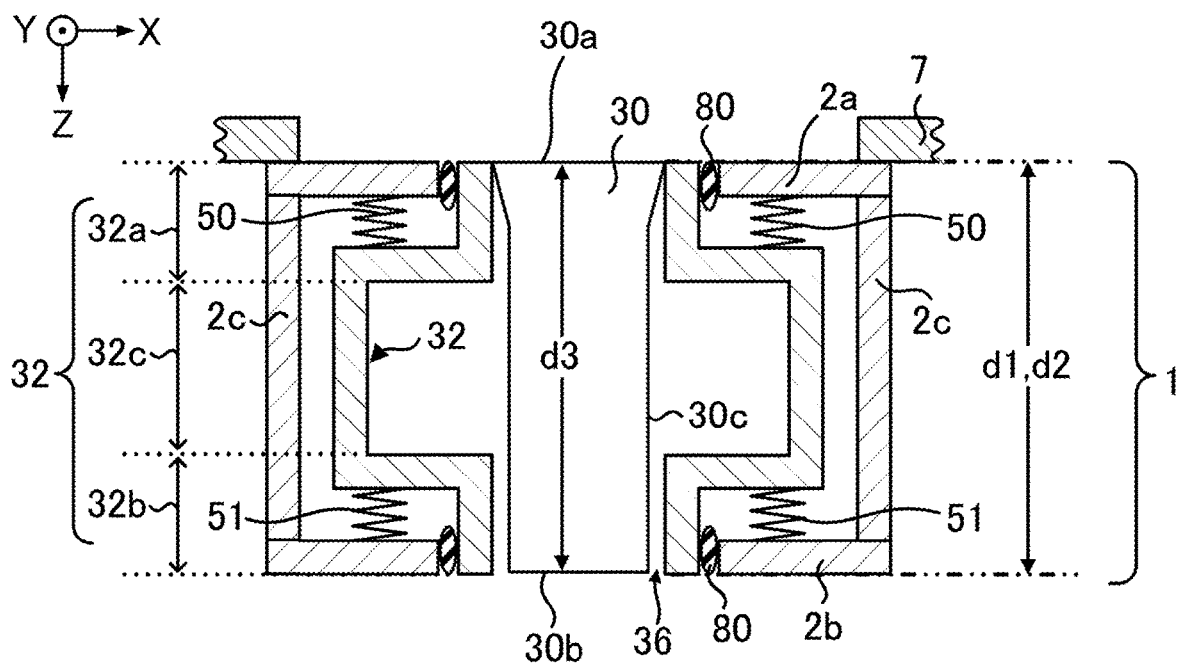
FIG. 8B is another schematic diagram of the sound output device 1 according to the modification mode 1.

FIG. 8A and FIG. 8B show examples of mode 1. As shown in the figures, the inner box 32 according to mode 1 has, in addition to the opening 35 that exposes the sound emitting portion 30a of the speaker unit 30 (the opening in the first portion of the chassis), an opening 36 that corresponds to the shape of the rear portion 30b in the back portion 32b (second portion of the chassis) on a side of the rear portion 30b of the speaker unit 30.

FIG. 8A is a modification of FIG. 7A. In the example shown in FIG. 8A, similarly to the inner box 32 shown in FIG. 7A, the inner box 32 has a boxlike portion and a first cylindrical portion (included in the back portion 32b of the inner box 32) that protrudes from the boxlike portion toward the positive Z-axis direction. In the example shown in FIG. 8A, the opening 36 is formed in the base of the cylindrical portion. As shown in the figure, neither the length d1 of the outer box 2 nor the length d2 of the inner box 32, in the central-axis direction of the speaker unit 30, is greater than the length d3 of the speaker unit 30. More specifically, the outer surface of the front board 2a of the outer box 2 and the outer surface of the front portion 32a of the inner box 32 are each on substantially the same plane as the sound emitting plane. Additionally, the outer surface of the back board 2b of the outer box 2 and the outer surface of the back portion 32b (more precisely, the base of the cylindrical portion) of the inner box 32 are each on substantially the same plane as the end surface of the rear portion 30b of the speaker unit 30 (the rear face of the speaker unit 30). In other words, the length of the sound output device 1 in the central-axis direction of the speaker unit 30 is substantially equal to the length d3 of the speaker unit 30.

In the example shown in FIG. 8A, similarly to the example shown in FIG. 7A, the vibration dampers 51 are provided between the back portion 32b of the inner box 32 (more precisely, the boxlike portion corresponding to the back portion 32b) and the back board 2b of the outer box 2. However, in the example shown in FIG. 8A, the vibration dampers 50 are not provided on the sound emitting portion 30a side. Additionally, a gap between the front board 2a of the outer box 2 (first portion of the attaching member) and the front portion 32a of the inner box 32 (first portion of the chassis) is sealed with a sealing member 80.

The sealing member 80 is a member that reduces transmission of sounds. For example, grease, rubber, or closed-pore sponge may be used for the sealing member 80.

FIG. 8B is a modification of FIG. 7B. In the example shown in FIG. 8B, similarly to the inner box 32 described with reference to FIG. 7B, the inner box 32 has a boxlike portion, a first cylindrical portion (included in the back portion 32b of the inner box 32) that protrudes from the boxlike portion toward the positive Z-axis direction, and a second cylindrical portion (included in the front portion 32a of the inner box 32) that protrudes from the boxlike portion toward the negative Z-axis direction. In the example shown in FIG. 8B, however, the first cylindrical portion has no base. In other words, in FIG. 7B, an exemplary configuration is shown in which the end (base) of the cylindrical portion on a positive Z-axis side is closed. In the configuration shown in FIG. 8B, however, the base of the cylindrical portion is opened by the opening 36. In FIG. 8B, similarly to the example shown in FIG. 8A, neither the length d1 of the outer box 2 nor the length d2 of the inner box 32 is greater than the length d3 of the speaker unit 30 in the central-axis direction of the speaker unit 30. Also, the length of the sound output device 1 is substantially equal to the length d3 of the speaker unit 30 in the central-axis direction of the speaker unit 30. More specifically, in the central-axis direction of the speaker unit 30, the outer surface of the front board 2a of the outer box 2 and the upper-end surface of the second cylindrical portion of the front portion 32a of the inner box 32 are each on substantially the same plane as the sound emitting plane, and the outer surface of the back board 2b of the outer box 2 and the lower-end surface of the first cylindrical portion of the back portion 32b of the inner box 32 are each on substantially the same plane as the rear face of the speaker unit 30.

In FIG. 8B, similarly to the exemplary configuration shown in FIG. 7B, the vibration dampers 50 are disposed between the front board 2a of the outer box 2 and the front portion 32a of the inner box 32 (more precisely, the boxlike portion corresponding to the front portion 32a), and the vibration dampers 51 are disposed between the back board 2b of the outer box 2 and the back portion 32b of the inner box 32 (more precisely, the boxlike portion corresponding to the back portion 32b). A gap between the front board 2a of the outer box 2 (first portion of the attaching member) and the front portion 32a (more precisely, the second cylindrical portion of the front portion 32a) of the inner box 32 (first portion of the chassis) is sealed with a sealing member 80. Also, a gap between the back board 2b of the outer box 2 (second portion of the attaching member) and the back portion 32b (more precisely, the first cylindrical portion of the back portion 32b) of the inner box 32 (second portion of the chassis) is sealed with a sealing member 80.

In the above configuration, advantageous effects similar to those achieved in the first embodiment are achieved. In a configuration in which the inner box 32 is sealed, there will be generated air spring inside the inner box 32 due to compression of the air, and thus the vibrations of the sound emitting portion 30a (e.g., diaphragm) of the speaker unit 30 may be hampered. In the configuration according to the present mode, since the inner box 32 has the opening 36, air spring will not be generated between the speaker unit 30 and the inner box 32. Thus, the sound emitting portion 30a is able to vibrate sufficiently, which enables easy emission of sounds having high sound pressure by the speaker unit 30. Moreover, in the configuration according to the present mode, the sound output device 1 is configured such that in the central-axis direction of the speaker unit 30, each of the length d1 of the outer box 2 and the length d2 of the inner box 32 is equal to or smaller than the length d3 of the speaker unit 30. Thus, compared with a configuration in which at least one of the length d1 of the outer box 2 or the length d2 of the inner box 32 is greater than the length of the speaker unit (e.g., either of the exemplary configurations shown in FIG. 7A and FIG. 7B), the sound output device 1 according to the present mode is reduced in size. Furthermore, since the sealing member 80 seals the gap between the outer box 2 and the inner box 32, there is a reduction in sounds that are emitted from the rear portion 30b of the speaker unit 30, passing through the space between the outer box 2 and the inner box 32, and then transmitted to a side of the sound emitting portion 30a of the speaker unit 30. In other words, the sneaking of the sounds emitted from the rear portion 30b of the speaker unit 30 to the sound emitting portion 30a side is lessened.

FIG. 8B shows an example in which each of the gap between the front board 2a of the outer box 2 and the front portion 32a of the inner box 32 and the gap between the back board 2b of the outer box 2 and the back portion 32b of the inner box 32 is sealed by a sealing member 80. Alternatively, only the gap between the front board 2a of the outer box 2 and the front portion 32a of the inner box 32 may be sealed, or only the gap between the back board 2b of the outer box 2 and the back portion 32b of the inner box 32 may be sealed. From a viewpoint of lessening the sneaking of sounds to the sound emitting portion 30a side, it is preferable to seal the gap between the front board 2a of the outer box 2 and the front portion 32a of the inner box 32, on the sound emitting portion 30a side.

Modification Mode 2

Figure 9A:
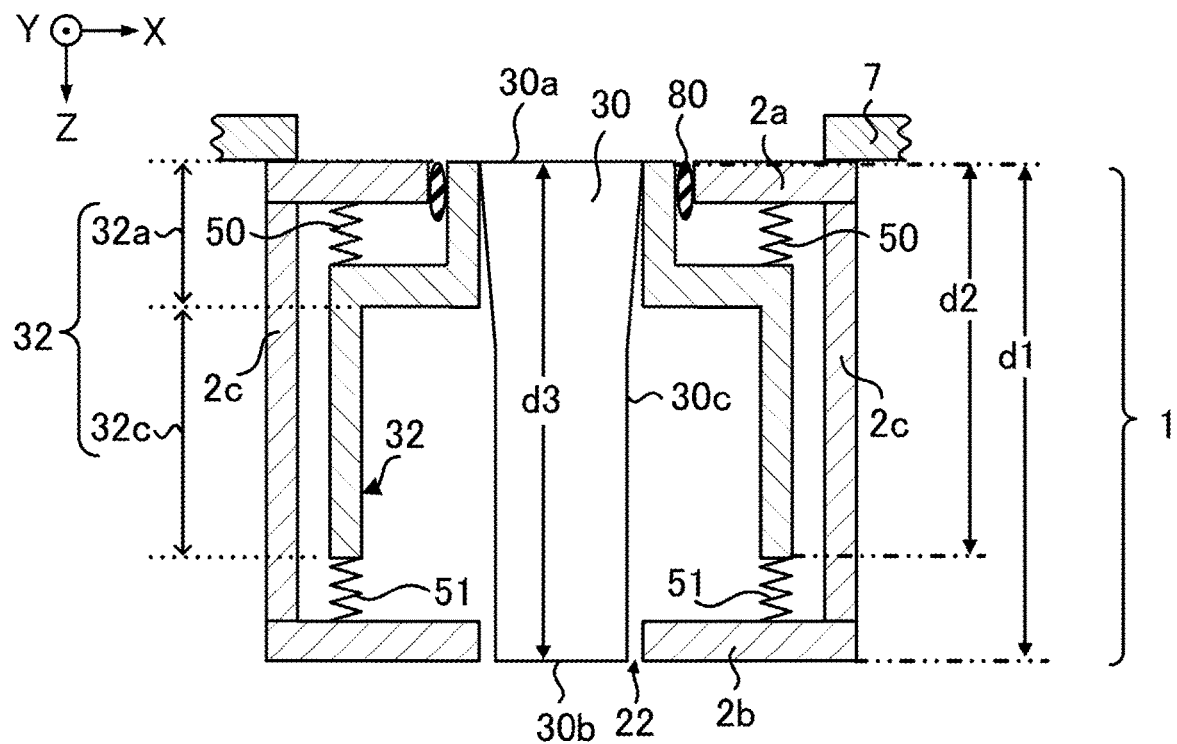
FIG. 9A is a schematic diagram of a sound output device 1 according to modification mode 2.
Figure 9B:
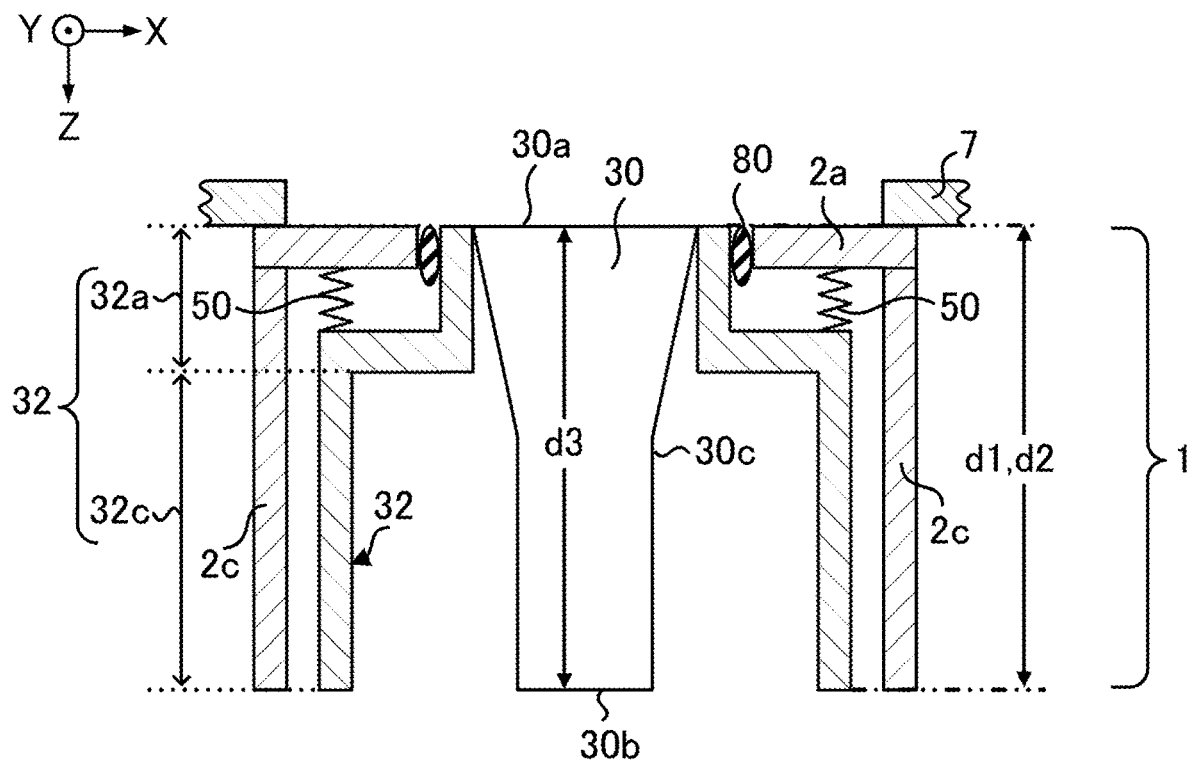
FIG. 9B is another schematic diagram of the sound output device 1 according to the modification mode 2.

In examples of mode 2 shown in FIG. 9A and FIG. 9B, the back portion 32b of the inner box 32 (second portion of the chassis) described in the example of the first embodiment is omitted, and the inner box 32 has a structure with the positive Z-axis side open. In other words, the inner box 32 has a boxlike portion without a base and a cylindrical portion that protrudes from the boxlike portion toward the negative Z-axis direction. Similarly to mode 1, in the examples of mode 2, neither the length d1 of the outer box 2 nor the length d2 of the inner box 32 is greater than the length d3 of the speaker unit 30, and the length of the sound output device 1 is substantially equal to the length d3 of the speaker unit 30 in the central-axis direction of the speaker unit 30. In both examples, the gap between the front board 2a of the outer box 2 (first portion of the attaching member) and the front portion 32a of the inner box 32 (first portion of the chassis) is sealed with the sealing member 80.

In the example shown in FIG. 9A, in the central-axis direction of the speaker unit 30 (in the Z-axis direction), the outer surface of the front board 2a of the outer box 2 and the upper-end surface of the cylindrical portion of the front portion 32a of the inner box 32 are each on substantially the same plane as the sound emitting plane. The outer surface of the back board 2b of the outer box 2 is on substantially the same plane as the rear face of the speaker unit 30. The end surface (which may be referred to as a rim) of the side portion 32c of the inner box 32 on the rear portion 30b side (the side opposite to the sound emitting portion 30a) is on the negative Z-axis side relative to the rear portion 30b. The sound output device 1 in this example has vibration dampers 50 between the front board 2a of the outer box 2 and the front portion 32a of the inner box 32 (more precisely, the boxlike portion corresponding to the front portion 32a), and has vibration dampers 51 between the back board 2b of the outer box 2 (second portion of the attaching member) and the side portion 32c of the inner box 32 (third portion of the chassis). More precisely, the vibration dampers 51 are disposed between the back board 2b of the outer box 2 and the rim of the side portion 32c of the inner box 32.

In the example shown in FIG. 9B, the back board 2b of the outer box 2 (second portion of the attaching member) described in the example of the first embodiment is omitted, and the outer box 2 has a structure with the positive Z-axis side open. In the central-axis direction of the speaker unit 30, the outer surface of the front board 2a of the outer box 2 and the upper-end surface of the cylindrical portion of the front portion 32a of the inner box 32 are each on substantially the same plane as the sound emitting plane. The end surfaces of the side boards 2c of the outer box 2 on the rear portion 30b side and the end surface of the side portion 32c of the inner box 32 on the rear portion 30b side are each on substantially the same plane as the rear face of the speaker unit 30. The sound output device 1 in this example includes vibration dampers 50 between the front board 2a of the outer box 2 and the front portion 32a of the inner box 32 (more precisely, the boxlike portion corresponding to the front portion 32a).

In the above configuration, advantageous effects similar to those achieved in the first embodiment are achieved. Additionally, since the inner box 32 housing the speaker unit 30 does not have a back portion 32b (since the positive Z-axis side of the inner box 32 is open), compared with a configuration in which the inner box is sealed, the speaker unit 30 is able to emit sounds having high sound pressure with ease.

Moreover, since the positive Z-axis side of the inner box 32 is open, the sound output device 1 can be configured such that, in the central-axis direction of the speaker unit 30, each of the length d1 of the outer box 2 and the length d2 of the inner box 32 is equal to or smaller than the length d3 of the speaker unit 30. Thus, compared with a configuration in which at least one of the length d1 of the outer box 2 or the length d2 of the inner box 32 is greater than the length of the speaker unit (e.g., either of the configurations shown in FIG. 7A and FIG. 7B), the sound output device 1 in this mode is reduced in size. Furthermore, since the gap between the front board 2a of the outer box 2 and the front portion 32a of the inner box 32 is sealed with the sealing member 80, sounds that are emitted from the rear portion 30b of the speaker unit 30, passing through the space between the outer box 2 and the inner box 32, and transmitted to a side of the sound emitting portion 30a are reduced. In other words, the sneaking of the sounds emitted from the rear portion 30b of the speaker unit 30 to the sound emitting portion 30a side is lessened.

In the examples shown in FIG. 8A to FIG. 9B, a space in the object 7 to which the sound output device 1 is attached can serve as an enclosure that lessens the sneaking of the sounds emitted from the rear portion 30b of the speaker unit 30 to the sound emitting portion 30a side (the sneaking of the sounds passing through the outside of the outer box 2). Here, the object 7 is, for example, the interior of a car, and the space in the object 7 is, for example, the space inside the interior of the car.

In FIG. 8A to FIG. 9B, examples are shown in which the length d1 of the outer box 2 and the length d2 of the inner box 32 are substantially equal to the length d3 of the speaker unit 30. However, each of the length d1 of the outer box 2 and the length d2 of the inner box 32 may be freely modified to the extent that the length of the sound output device 1 does not exceed the length d3 of the speaker unit 30.

The inner box 32 may have the side portion 32c alone. In this case, the vibration dampers 50 may be disposed between the front board 2a of the outer box 2 and the end surface (rim) of the side portion 32c of the inner box on the sound emitting portion 30a side, and the vibration dampers 51 may be disposed between the back board 2b of the outer box 2 and the end surface (rim) of the side portion 32c of the inner box 32 on the rear portion 30b side.

In a case in which the sealing member 80 serves to reduce vibrations that are transmitted from the inner box 32 to the outer box 2, the sound output device 1 may be provided with the sealing member 80 alone, without the vibration dampers 50 and 51. In other words, the sealing member 80 may serve in place of the vibration damper (it can also be understood that the vibration dampers 50 and 51 may serve as sealing members 80). In this case, the sealing members 80 may be disposed at the positions of the vibration dampers 50 and 51, instead of the position shown in the figures. In a case in which the vibration dampers 50 and 51 serve as the sealing members 80, in order to lessen the sneaking of the sounds emitted from the rear portion 30b of the speaker unit 30 to the sound emitting portion 30a side, the vibration dampers 50 and 51 are to seal gaps between the outer box 2 and the inner box 32 (e.g., a gap between the front board 2a and the boxlike portion corresponding to the front portion 32a, a gap between the back board 2b and the boxlike portion corresponding to the back portion 32b, etc.).

In the above examples, the outer box 2 is box-shaped. However, the outer box 2 may be of any shape so long as it attaches the inner box 32 via the vibration dampers. For example, the outer box may be tabular or column-shaped. In a case in which the outer box 2 is tabular, the front board 2a corresponds to the first portion of the attaching member. In a case in which the outer box 2 is column-shaped with its central axis parallel to the Z-axis, a face of the column on the sound emitting portion 30a side corresponds to the front board 2a (first portion of the attaching member), and a face of the column on the rear portion 30b side corresponds to the back board 2b (second portion of the attaching member), and a cylindrical part of the column corresponds to the side boards 2c (third portion of the attaching member).

Similarly, in the above examples, the front portion 32a and the side portion 32c of the inner box 32 are tabular. However, the side portion 32c may be any other shape, such as tubular. More specifically, the inner box 32 may be column-shaped with its central axis parallel to the Z-axis. In this case, a face of the column on the sound emitting portion 30a side corresponds to the front portion 32a (first portion of the chassis), a face of the column on the rear portion 30b side corresponds to the back portion 32b (second portion of the chassis), and a cylindrical part of the column corresponds to the side portion 32c (third portion of the chassis).

Second Embodiment

Figure 10:
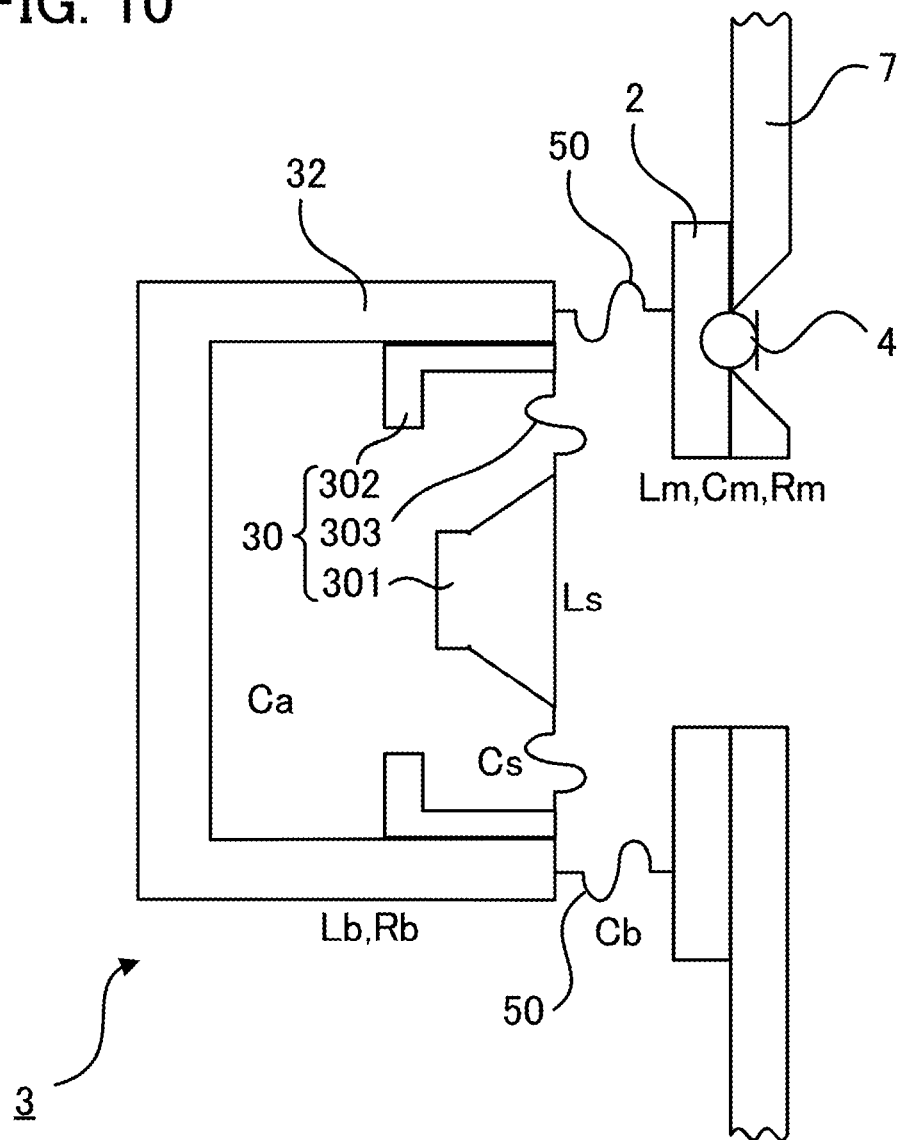
FIG. 10 is an illustration showing an analytical model of a sound output device 1 in a second embodiment.
Figure 11:
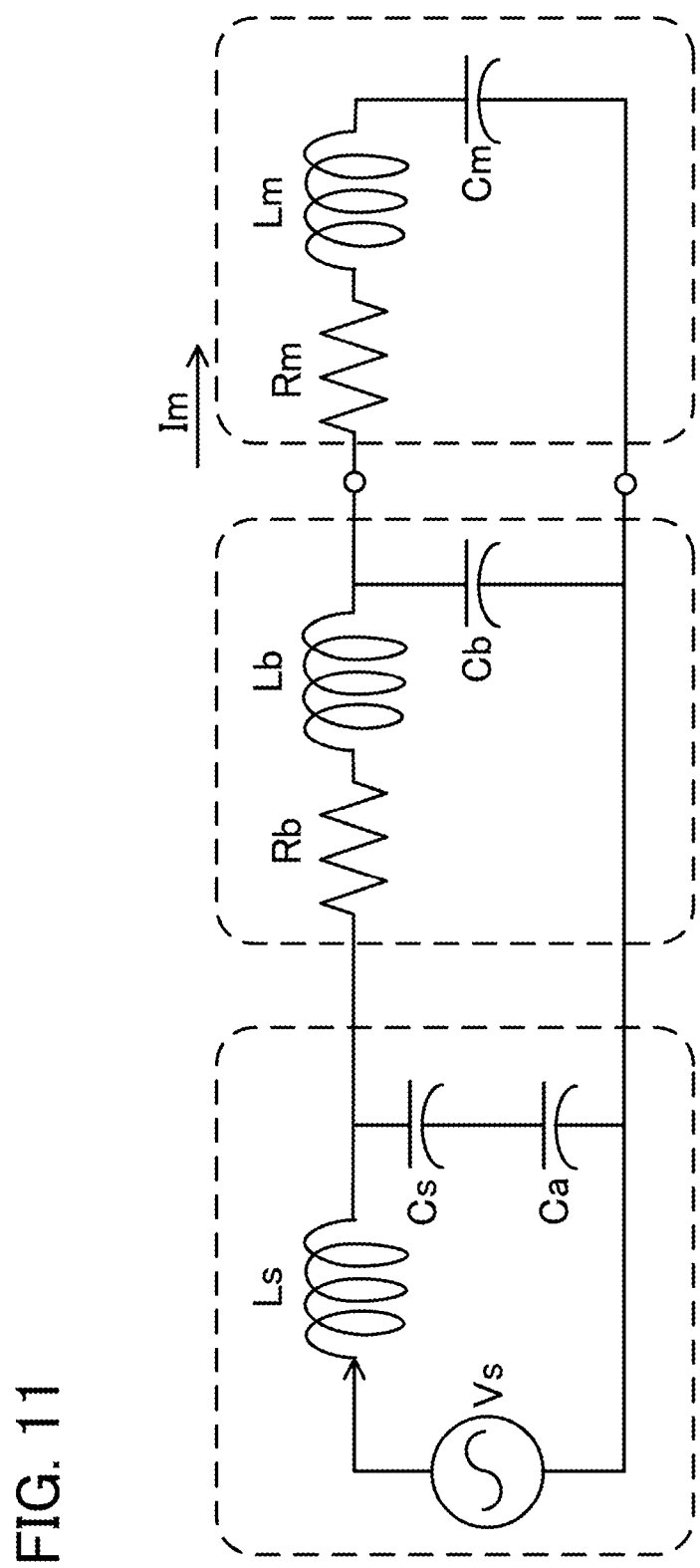
FIG. 11 shows an equivalent circuit of the analytical model shown in FIG. 10.

With reference to FIG. 10 and FIG. 11, a second embodiment of the invention will be described. In each embodiment described below as an example, for those elements that are common with those in the first embodiment in their effects and functions, the same reference signs as those used in the description of the first embodiment will be used, and detailed explanations thereof will be omitted as appropriate.

FIG. 10 shows an analytical model of a sound output device 1 according to the second embodiment. FIG. 11 shows an equivalent circuit of the analytical model. The speaker unit 30 has a movable portion 301 that emits sounds with vibrations, a non-movable portion 302, and an elastic member 303 that connects the movable portion 301 and the non-movable portion 302. The movable portion 301 includes, for example, a diaphragm (the sound emitting portion 30a) and a voice coil that transmits vibrations to the diaphragm. The non-movable portion 302 includes, for example, a frame that secures the diaphragm and the voice coil. The elastic member 303 is, for example, a speaker surround that connects the diaphragm and the frame.

As in the analytical model shown in FIG. 10, the mass of the movable portion 301 is referred to as Ls, the compliance of the air inside the inner box 32 is referred to as Ca, the compliance of the elastic member 303 is referred to as Cs, the total mass of the inner box 32 and the non-movable portion 302 is referred to as Lb, and the total resistance component of the inner box 32 and the non-movable portion 302 is referred to as Rb. The compliance of the vibration dampers 50 is referred to as Cb, the total mass of the outer box 2 and the object 7 (e.g., the interior of a car) to which the sound output device 1 is attached is referred to as Lm, the total compliance of the outer box 2 and the object 7 is referred to as Cm, and the total resistance component of the outer box 2 and the object 7 is referred to as Rm.

The sound output device 1 in this embodiment can be expressed as an equivalent circuit as shown in FIG. 11. In FIG. 11, Vs indicates the power to drive the movable portion 301, and Im indicates the vibration velocity at the outer box 2 and the object 7. In the equivalent circuit shown in FIG. 11, the total mass Lb of the inner box 32 and the non-movable portion 302 and the compliance Cb of the vibration dampers 50 together form a low-pass filter. The resonant frequency generated by the mass Ls of the movable portion 301, the compliance Cs of the elastic member 303, and the compliance Ca of the air inside the inner box 32, is referred to as f1. The cutoff frequency of the low-pass filter, which is formed by the total mass Lb of the inner box 32 and the non-movable portion 302 and the compliance Cb of the vibration dampers 50, is referred to as f2. In this embodiment, the resonant frequency f1 and the cutoff frequency f2 are designed to satisfy the relationship f2<f1.

According to this embodiment, vibrations of the speaker unit 30 (movable portion 301) that are transmitted to the outer box 2 are reduced by the low-pass filter, which is formed by the total mass Lb of the inner box 32 and the non-movable portion 302 and the compliance Cb of the vibration dampers 50. Thus, vibrations of the speaker unit 30 that are transmitted to the surroundings of the microphone 4 are reduced. Moreover, since noise that is generated by the vibrations is reduced (that is, noise transmitted to the microphone 4 is reduced), echo-cancellation performance can be improved.

Third Embodiment

With reference to accompanying drawings, a third embodiment of the invention will be described next.

Figure 12A:
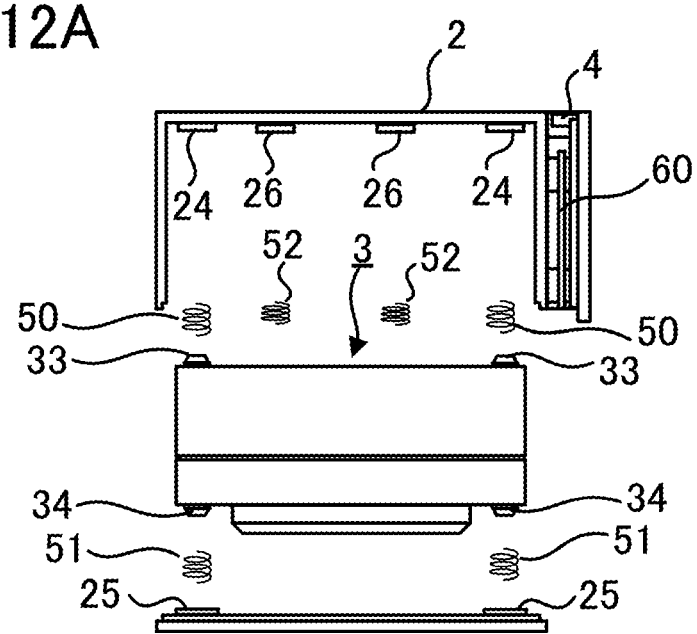
FIG. 12A is an exploded view of the cross-sectional view of a sound output device 1 according to a third embodiment.
Figure 12B:
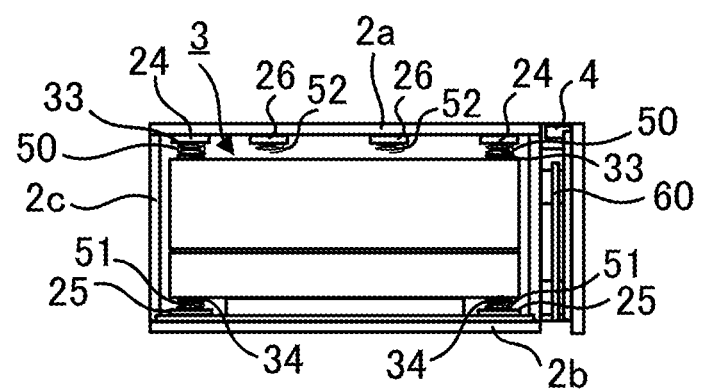
FIG. 12B is a cross-sectional view of the sound output device 1 according to the third embodiment.

FIG. 12A is an exploded view, along the Z-axis, of a cross-section of a sound output device 1 according to the third embodiment. FIG. 12B is a cross-sectional view of the sound output device 1 of the third embodiment. As shown in FIG. 12A, in this embodiment, two types of springs are used for vibration dampers provided on a side of the front portion 32a of the inner box 32. In other words, in addition to the spring members used as the vibration dampers 50 in the first embodiment, other spring members (vibration dampers 52) are provided. The vibration dampers 52 have a larger spring constant than the spring members that are used as the vibration dampers 50. On the inner surface of the front board 2a of the outer box 2 (the surface on a side of the front portion 32a of the inner box 32), there are formed holding parts 26, and one end of each vibration damper 52 is attached to a corresponding one of the holding parts 26. More specifically, one end of a vibration damper 52 is inserted into the concave part of the corresponding, for example, concave-shaped holding part 26.

As shown in FIG. 12B, under normal conditions, the other ends of the vibration dampers 52 are not in contact with the front portion 32a of the inner box 32. When an excessive acceleration caused by vibrations is applied to the inner box 32, the other ends of the vibration dampers 52 come into contact with the front portion 32a of the inner box 32. In this way, with the provision of the vibration dampers 52, a collision between the inner box 32 and the front board 2a of the outer box 2, which could otherwise be caused when the inner box 32 vibrates, can be prevented.

As described above, in this embodiment, two types of spring members (vibration dampers) with varying spring constants are provided on the front portion 32a of the inner box 32. Thus, even when an excessive acceleration is applied to the inner box 32, a collision between the inner box 32 and the outer box 2 can be prevented, and consequently, noise that is caused by such collision can be reduced.

Instead of using two types of spring members, non-linear springs may be used as the vibration dampers 50. For example, springs that are made with spring members coiled into conical shape and have a spring constant that becomes greater (springs that become stiffer) with increasing loads may be used. Alternatively, non-linear springs that are made with spring members coiled into column shape with varying turn density may be used. In a case in which such non-linear springs are used, when an excessive acceleration is applied to the inner box 32, the spring constant increases before the inner box 32 comes into contact with the inner surface of the outer box 2, and thus, a collision between the inner box 32 and the outer box 2 will be prevented. As a result, noise that could be generated by such collision between the inner box 32 and the outer box 2 can be reduced.

Also in this embodiment, material used for the vibration dampers that absorb vibrations may be an elastic material other than springs (e.g., resin or sponges with varying hardness), or any material other than elastic material (e.g., gel). Alternatively, elastic material and another material may be used in combination as appropriate (e.g., a spring and a sponge, a sponge and gel).

Fourth Embodiment

Next, with reference to FIG. 13 and FIG. 14, a fourth embodiment of the invention will be described.

In the first to the third embodiments, examples are shown in which the sound output device 1 includes the inner box 32 (chassis) that houses the speaker unit 30 and the vibration dampers 50 and 51 lie between the outer box 2 (attaching member) and the inner box 32. In contrast, a sound output device 1 according to the fourth embodiment does not include the inner box 32, and the vibration dampers 50 lie between the attaching member and the speaker unit 30.

Figure 13:
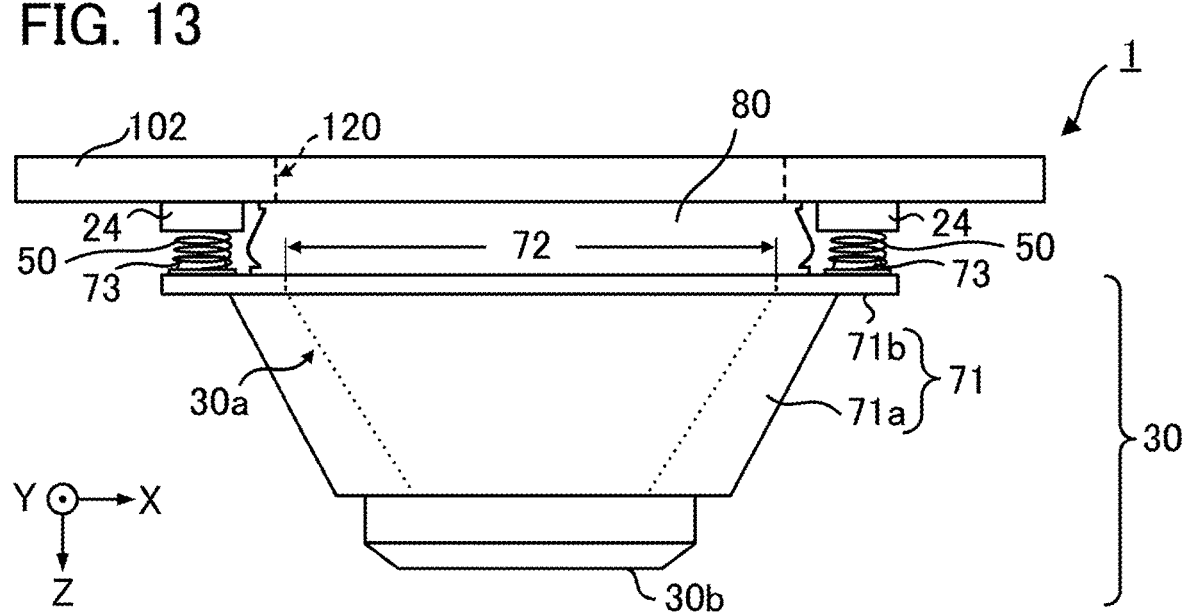
FIG. 13 is a schematic front view of a sound output device 1 according to a fourth embodiment.

FIG. 13 is a front view of the schematic configuration of the sound output device 1 of the fourth embodiment. The sound output device 1 of the fourth embodiment includes a tabular member 102 (attaching member) and the speaker unit 30. In the embodiments described above, examples are shown in which the box-shaped outer box 2 is used as the attaching member. As shown in FIG. 13, in an example of the present embodiment, the tabular member 102, instead of the outer box 2, is used as the attaching member (it can also be understood as a configuration in which the outer box 2 has the front board 2a alone).

The tabular member 102 of the present embodiment is substantially rectangular-shaped. As shown in FIG. 13, the tabular member 102 is on the negative Z-axis side relative to the speaker unit 30 and is substantially parallel to the sound emitting plane. In other words, the tabular member 102 corresponds to a portion of the attaching member on the sound emitting portion 30a side (first portion of the attaching member). The tabular member 102 can also be understood as the attaching member having the first portion alone. In the tabular member 102, an opening 120 is formed (shown with dashed lines in FIG. 13) that exposes the sound emitting portion 30a of the speaker unit 30 and corresponds to the shape of the sound emitting portion 30a. On the four corners of the inner surface of the tabular member 102 (the surface on a speaker unit 30 side), there are formed holding parts 24 that each have, for example, a concave shape.

The speaker unit 30 has, in addition to the sound emitting portion 30a, which is a portion that vibrates in accordance with audio signals to generate sounds (e.g., a diaphragm), a frame 71 by which the sound emitting portion 30a is fixed in a way that enables the sound emitting portion 30a to vibrate. The frame 71 has a housing portion 71a that houses the sound emitting portion 30a (in FIG. 13, the position of the sound emitting portion 30a is shown with dotted lines) and a substantially rectangular-shaped tabular portion 71b that is substantially parallel to the sound emitting plane. As shown in FIG. 13, the housing portion 71a of the present embodiment has its central axis parallel to the Z-axis, and has a shape of truncated cone dilating toward the negative Z-axis direction (the direction towards the sound emitting plane). The tabular portion 71b of the frame 71 has an opening 72 (shown with dashed lines in FIG. 13) that exposes the sound emitting portion 30a. The tabular portion 71b is provided on the negative Z-axis side relative to the housing portion 71a (on a tabular member 102 side). On the surface of the tabular portion 71b on the tabular member 102 side, there are formed holding parts 73 that, for example, protrude from the surface.

Figure 14:
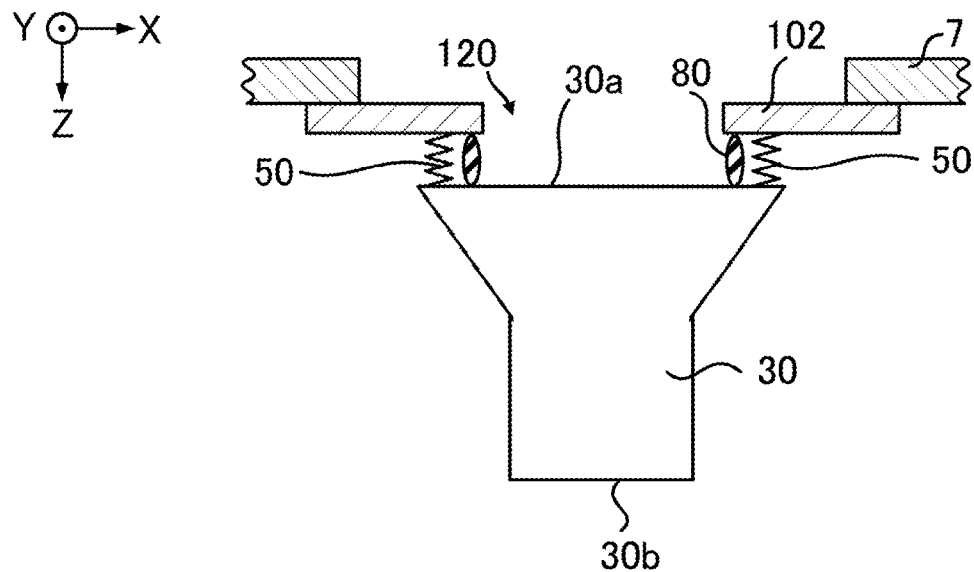
FIG. 14 is a schematic diagram of the sound output device 1 according to the fourth embodiment.

FIG. 14 shows a schematic diagram showing an example of a cross-section of the sound output device 1 when the sound output device 1 is viewed from the positive Y-axis side. For brevity, illustration of the holding parts 24 and 73, and details of the speaker unit 30, such as the frame 71, etc., are omitted in FIG. 14. Such simplified illustration also applies to FIG. 16 and FIG. 17, which are described later.

As shown in FIGS. 13 and 14, the vibration dampers 50 (separating members) lie between the tabular member 102 and the speaker unit 30. The vibration dampers 50 lie between the tabular member 102 and the speaker unit 30, separating them to absorb vibrations of the speaker unit 30. Similarly to the above-described embodiments, in this embodiment, a coiled spring member is used as an example of a vibration damper 50. One end of a vibration damper 50 is attached to a holding part 24 formed on the tabular member 102, and the other end of the vibration damper 50 is attached to a holding part 73 formed on the speaker unit 30 (tabular portion 71b). More specifically, a holding part 73 that, for example, protrudes from the surface is inserted into one end of a spring member, and the other end of the spring member is inserted into the concave part of a, for example, concave-shaped holding part 24. In the present embodiment, the vibration dampers 50 also serve to fix the speaker unit 30 to the tabular member 102.

In the following, the description of the holding parts (24 and 73) may be omitted for brevity. For example, the description that "the vibration dampers 50 lie between the tabular member 102 and the speaker unit 30" means that "the vibration dampers 50 lie between the holding parts 24 on the tabular member 102 and the holding part 73 on the speaker unit 30."

Between the tabular member 102 and the speaker unit 30 (more precisely, the tabular portion 71b of the frame 71 of the speaker unit 30), there is provided a sealing member 80. The sealing member 80 seals a gap between the periphery of the opening 120 in the tabular member 102 and the periphery of the sound emitting portion 30a (more precisely, the periphery of the opening 72 in the tabular portion 71b). More specifically, the sealing member 80 is a tubular member that lies between the tabular member 102 and the tabular portion 71b. One end of the sealing member 80 is attached on the periphery of the opening 120 in the tabular member 102, and the other end is attached on the periphery of the opening 72 in the tabular portion 71b. The opening 72 in the tabular portion 71b and the opening 120 in the tabular member 102 communicate with each other via the space inside the sealing member 80. Accordingly, sounds generated by the sound emitting portion 30a pass through the opening 72 in the tabular portion 71b, the space inside the sealing member 80, and the opening 120 in the tabular member 102, to be emitted to the external space. In other words, the sealing member 80 seals, from the external space, the space extending from the opening 72 in the tabular portion 71b to the opening 120 in the tabular member 102.

The sealing member 80 is a member that reduces transmission of sounds, and in the present embodiment, a rubber member is used as an example of the sealing member 80.

As shown in FIG. 14, the sound output device 1 is attached to a freely chosen object 7, such as the interior of a car. More specifically, the sound output device 1 is attached to the interior of a car such that the outer surface of the tabular member 102 (the surface opposite to the speaker unit 30 side), in which the opening 120 is formed, faces the back side of the interior. In this way, the sound emitting portion 30a of the speaker unit 30 faces toward the inside of the car. In other words, the tabular member 102 serves as an attaching member that attaches the speaker unit 30 to the object 7. The object 7 may be, for example, the ceiling of the car's interior (e.g., a part near a room lamp and/or a map lamp), a dashboard, or a door.

For brevity, only a portion of the object 7, to which the sound output device 1 is attached, is illustrated in FIG. 14. Such simplified illustration also applies to FIG. 16 and FIG. 17.

In this embodiment, as described above, the speaker unit 30 is attached to the tabular member 102 (attaching member) with the vibration dampers 50 (separating member) provided therebetween to separate them. In this way, when the speaker unit 30 generates sounds, vibrations generated by the speaker unit 30 are absorbed by the vibration dampers 50. Thus, in a case in which the sound output device 1 is attached to an object 7, e.g., the interior of a car, vibrations (vibrations generated by the speaker unit 30) that are transmitted to the object 7 via the tabular member 102 are reduced, and consequently, noise that is caused by the vibrations can be reduced. Moreover, since the sealing member 80 seals the gap between the periphery of the opening 120 in the tabular member 102 and the periphery of the sound emitting portion 30a, sounds that are emitted from the rear portion 30b of the speaker unit 30 and transmitted to the sound emitting portion 30a side are reduced. That is, the sneaking of the sounds emitted from the rear portion 30b of the speaker unit 30 to the sound emitting portion 30a side is lessened. In other words, the sealing member 80 serves similarly to the inner box 32 of the first to the third embodiments in reducing the sneaking of such sounds, and thus achieves a similar advantageous effect.

The sound output device 1 of the present embodiment does not include a microphone. In a case in which a microphone is provided, it may be provided near the speaker unit 30. In the configuration of the present embodiment, vibrations that are transmitted to the object 7 are reduced, and thus, noise that is caused by the vibrations and is transmitted to the microphone near the speaker unit 30 is also reduced. Accordingly, in the present embodiment, in addition to the above-described advantageous effect, an advantageous effect of lessening degradation of echo-cancellation performance is also achieved.

In this embodiment, an exemplary configuration is described in which material used for a vibration damper 50 is a spring. However, material used for a vibration damper 50 is not limited to a spring and may be any material that absorbs vibrations. Material used for a vibration damper 50 may be any elastic material other than a spring (e.g., a sponge, resin), or any other material (e.g., gel).

In the exemplary configuration described above, the sealing member 80 is provided between the periphery of the opening 120 in the tabular member 102 and the periphery of the sound emitting portion 30a. However, the sealing member 80 may be provided at any position that enables the reduction in the sounds that sneak to the sound emitting portion 30a side after being emitted from the rear portion 30b. In the example shown in FIG. 13, the sealing member 80 is disposed on a side of the central axis of the speaker unit 30 along the X-axis relative to the vibration dampers 50 (i.e., disposed inward relative to the vibration dampers 50). However, the sealing member 80 may be disposed farther from the central axis than the vibration dampers 50 (i.e., disposed outward relative to the vibration dampers 50). In FIGS. 13 and 14, an example is shown in which the attaching member (the tabular member 102) is tabular. However, the attaching member may have a front board 2a and side boards 2c, such as those described in the first embodiment. In this case, the sealing member 80 may be provided between the side boards 2c and the speaker unit 30 (e.g., the tabular portion 71b of the frame 71).

In the above description, an example of a tabular portion 71b having a substantially tabular shape is described. However, the tabular portion 71b may have, for example, a round shape or any other shape. Additionally, the surface of the tabular portion 71b does not need to be flat.

Similarly, in the above description, an example of a housing portion 71a having a truncated cone shape is described. However, the housing portion 71a may have a truncated square pyramid shape, a cuboid shape, or any other shape.

In the above example, the vibration dampers 50 serve to fix the speaker unit 30 to the tabular member 102. Alternatively, the sealing member 80 may fix the speaker unit 30 to the tabular member 102. Alternatively, any other member may fix the speaker unit 30 to the tabular member 102, as long as the function of reducing vibrations transmitted to the object 7 is not hampered.

Modifications of Fourth Embodiment

The sound output device 1 according to the fourth embodiment can be modified in a variety of ways. Two or more modes freely selected from the modes described below may be appropriately combined as long as they are not in conflict with one another.

Modification Mode 1

In the fourth embodiment, an exemplary configuration is described in which material used for the sealing member 80 is rubber. However, material used for the sealing member 80 may be any other material that reduces transmission of sounds, such as grease or closed-pore sponge.

Figure 15:
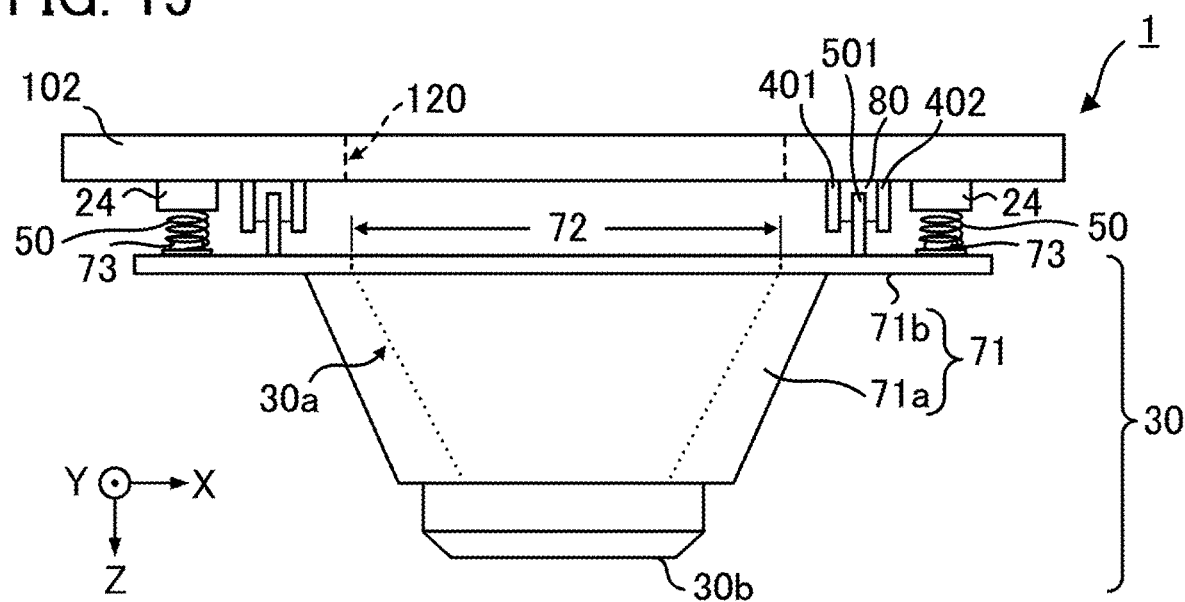
FIG. 15 is an illustration showing a schematic configuration of a sound output device 1 according to modification mode 1.

FIG. 15 shows a schematic configuration of a sound output device 1 according to mode 1. In mode 1, grease is used for the sealing member 80. On the surface of the tabular member 102 on the speaker unit 30 side, an inner cylinder 401 and an outer cylinder 402 that has a greater inner diameter than the outer diameter of the inner cylinder 401 are formed concentrically on the periphery of the opening 120. On the surface of the tabular portion 71b of the speaker unit 30 on the tabular member 102 side, a cylindrical portion 501 is formed concentrically on the periphery of the opening 72. The inner diameter of the cylindrical portion 501 is greater than the outer diameter of the inner cylinder 401, and the outer diameter of the cylindrical portion 501 is smaller than the inner diameter of the outer cylinder 402. The length in the Z-axis direction (the height) of each of the inner cylinder 401, the outer cylinder 402, and the cylindrical portion 501 is smaller than the length in the Z-axis direction of a separating member lying between the tabular member 102 and the speaker unit 30.

As shown in the figure, in a state in which the sound output device 1 has been assembled, the cylindrical portion 501 is provided between the inner cylinder 401 and the outer cylinder 402. In other words, the inner cylinder 401 and the outer cylinder 402 are separated from each other to the extent that the cylindrical portion 501 can be provided therebetween. The space between the inner cylinder 401 and the outer cylinder 402 is filled with grease (sealing member 80) to seal the gap between the periphery of the opening 120 in the tabular member 102 and the periphery of the sound emitting portion 30a (more precisely, the periphery of the opening 72 in the tabular portion 71b). For example, the sound output device 1 may be assembled by pushing the cylindrical portion 501 into the space between the inner cylinder 401 and the outer cylinder 402 after grease (sealing member 80) has been poured into the space between the inner cylinder 401 and the outer cylinder 402.

In the above configuration, advantageous effects similar to those of the fourth embodiment are achieved.

Modification Mode 2

Figure 16:
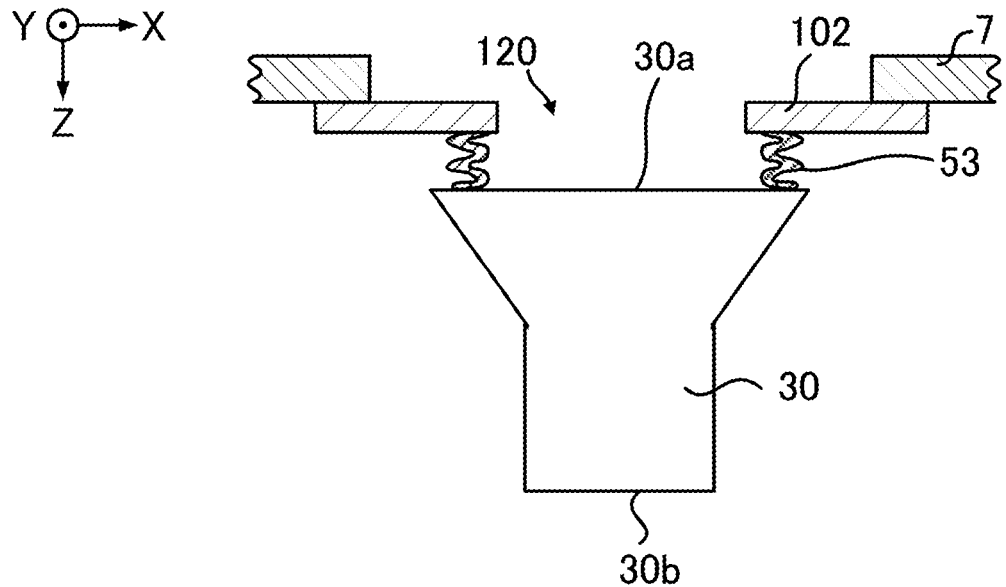
FIG. 16 is a schematic diagram of a sound output device 1 according to modification mode 2.

FIG. 16 is a schematic diagram showing an example of a cross-section of a sound output device 1 according to mode 2, when the sound output device 1 is viewed from the positive Y-axis side. As shown in the figure, the sound output device 1 according to mode 2 includes, instead of the vibration dampers 50 and the sealing member 80, a vibration damper 53 (separating member). The vibration damper 53 serves as the vibration dampers 50 and the sealing member 80 described in the fourth embodiment. The vibration damper 53 lies between the tabular member 102 and the speaker unit 30, separating them to absorb vibrations of the speaker unit 30. The vibration damper 53 is a member that reduces transmission of sounds and seals the gap between the tabular member 102 and the speaker unit 30. More specifically, the vibration damper 53 seals the gap between the periphery of the opening 120 in the tabular member 102 and the periphery of the sound emitting portion 30a of the speaker unit 30 (more precisely, the periphery of the opening 72 in the tabular portion 71b). The vibration damper 53 is, for example, a rubber member.

In mode 2, the holding parts 24 are not essential for the tabular member 102, and the holding parts 73 are not essential for the speaker unit 30.

Also in the above configuration, advantageous effects similar to those of the fourth embodiment are achieved. When the speaker unit 30 emits sounds, vibrations generated by the speaker unit 30 are absorbed by the vibration damper 53. Thus, in a case in which the sound output device 1 is attached to the object 7, an example of which is the interior of a car, vibrations (vibrations generated by the speaker unit 30) that are transmitted to the object 7 via the tabular member 102 are reduced, and consequently, noise that is caused by the vibrations can be reduced. Moreover, since the vibration damper 53 seals the gap between the periphery of the opening 120 in the tabular member 102 and the periphery of the sound emitting portion 30a, sounds that are emitted from the rear portion 30b of the speaker unit 30 and are then transmitted to a side of the sound emitting portion 30a of the speaker unit 30 are reduced. That is, the sneaking of the sounds emitted from the rear portion 30b of the speaker unit 30 to the sound emitting portion 30a side is lessened. Furthermore, since the vibration damper 53 serves as the vibration dampers 50 and the sealing member 80, compared with a configuration in which the vibration dampers 50 and the sealing member 80 are provided separately, the number of parts that are used to manufacture the sound output device 1 is reduced, and thus, man-hours required for manufacturing the sound output device 1 can be reduced. As a result, the cost of manufacturing the sound output device 1 can be reduced.

Modification Mode 3

Figure 17:
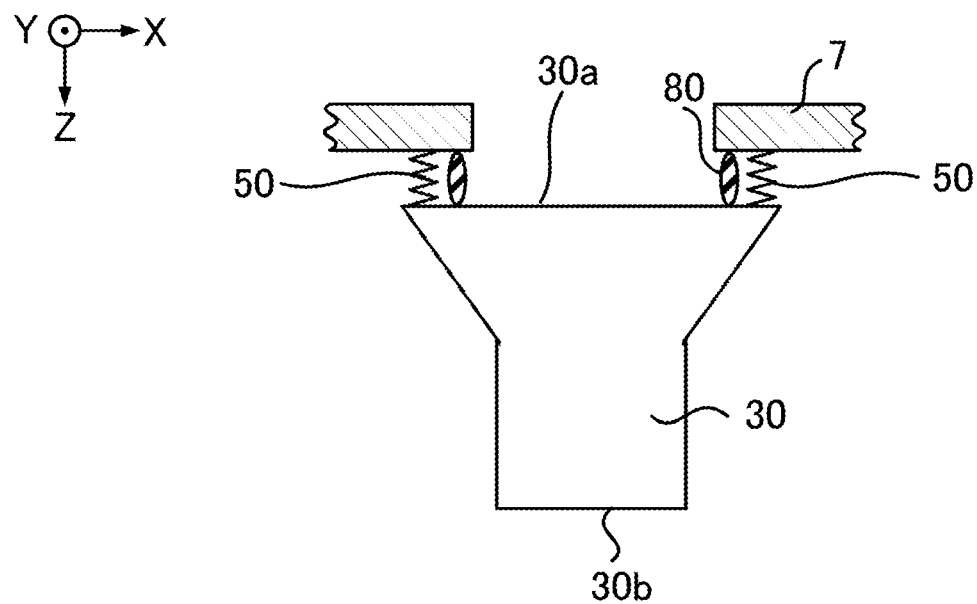
FIG. 17 is a schematic diagram of a sound output device 1 according to modification mode 3.

FIG. 17 is a schematic diagram showing an example of a cross-section of a sound output device 1 according to mode 3, when the sound output device 1 is viewed from the positive Y-axis side. As shown in the figure, the sound output device 1 according to mode 3 includes, similarly to the sound output device 1 according to the fourth embodiment, the speaker unit 30, the vibration dampers 50 (separating member), and the sealing member 80. The sound output device 1 according to mode 3, however, does not include the tabular member 102 (attaching member). In mode 3, the vibration dampers 50 lie between the object 7, to which the sound output device 1 is attached, and the speaker unit 30, separating them to absorb vibrations of the speaker unit 30. The sealing member 80 seals the gap between the object 7 (more precisely, the periphery of an opening provided in the object 7, wherein the opening is for enabling sounds generated by the sound emitting portion 30a to pass through) and the speaker unit 30 (more precisely, the periphery of the opening 72 in the tabular portion 71b).

In the above configuration, advantageous effects similar to those of the fourth embodiment are achieved. When the speaker unit 30 emits sounds, vibrations generated by the speaker unit 30 are absorbed by the vibration dampers 50. Thus, in a case in which the sound output device 1 is attached to the object 7, an example of which is the interior of a car, vibrations (vibrations generated by the speaker unit 30) that are transmitted to the object 7 via the vibration dampers 50 are reduced, and consequently, noise that is caused by the vibrations can be reduced. Moreover, since the sealing member 80 seals the gap between the opening in the object 7 and the periphery of the sound emitting portion 30a, sounds that are emitted from the rear portion 30b of the speaker unit 30 and are then transmitted to a side of the sound emitting portion 30a of the speaker unit 30 are reduced. That is, the sneaking of the sounds emitted from the rear portion 30b of the speaker unit 30 to the sound emitting portion 30a side is lessened. Furthermore, in the configuration of mode 3, the speaker unit 30 is attached to the object 7 without the attaching member (tabular member 102) lying therebetween. Thus, compared with a configuration in which an attaching member is provided, the number of parts that are used to manufacture the sound output device 1 is reduced, and thus, man-hours required for manufacturing the sound output device 1 can be reduced. As a result, the cost of manufacturing the sound output device 1 can be reduced.

In the fourth embodiment and its modification modes, a space in the object 7 to which the sound output device 1 is attached can serve as an enclosure that lessens the sneaking of the sounds emitted from the rear portion 30b of the speaker unit 30 to the sound emitting portion 30a side. Here, the object 7 is, for example, the interior of a car, and the space in the object 7 is, for example, the space inside the interior of the car.

The following aspects or modes are derived from the above-mentioned embodiments and modifications.

A sound output device according to a first aspect of the present invention includes: a speaker unit that has a sound emitting portion; an attaching member by which the speaker unit is attached to an object; a separating member that is provided between the speaker unit and the attaching member to separate the speaker unit from the attaching member; and a sealing member that is provided between the speaker unit and the attaching member to reduce a sound that is emitted from a side of the speaker unit opposite to the sound emitting portion and is transmitted to a sound emitting portion side. The attaching member has a first portion on a side of the sound emitting portion of the speaker unit, and the first portion of the attaching member has an opening that corresponds to the sound emitting portion. One end of the separating member is attached to the speaker unit and the other end of the separating member is attached to the attaching member, and one end of the sealing member is attached to the speaker unit and the other end of the sealing member is attached to the attaching member.

A sound output device according to a second aspect of the present invention includes: a speaker unit that has a sound emitting portion; an attaching member by which the speaker unit is attached to an object; and a separating member that is provided between the speaker unit and the attaching member to separate the speaker unit from the attaching member. The separating member reduces a sound that is emitted from a side of the speaker unit opposite to the sound emitting portion and is transmitted to a sound emitting portion side. One end of the separating member is attached to the speaker unit and the other end of the separating member is attached to the attaching member. The attaching member has a first portion on a side of the sound emitting portion of the speaker unit, and the first portion of the attaching member has an opening that corresponds to the sound emitting portion.

A sound output device according to a third aspect of the present invention includes: a chassis that houses a speaker unit that has a sound emitting portion; an attaching member by which the chassis is attached to an object; and separating members that are provided between the chassis and the attaching member to separate the chassis from the attaching member. The chassis has a first portion on a side of the sound emitting portion of the speaker unit, the attaching member has a first portion on a side of the sound emitting portion of the speaker unit, and the first portion of the chassis and the first portion of the attaching member each have an opening that corresponds to the sound emitting portion.

In any of the configurations of the sound output devices according to the first to third aspects, when a sound is emitted from the speaker unit, vibrations generated by the speaker unit are absorbed by the separating member. Accordingly, in a case in which the sound output device is attached to, for example, the interior of a car, vibrations (vibrations transmitted from the speaker unit) that are transmitted to the car's interior (i.e., transmitted outside from the sound output device) via the attaching member are reduced, resulting in a reduction in noise generated by the vibrations.

In a mode of the third aspect of the invention, the attaching member has a second portion that is provided on a side opposite to the sound emitting portion of the speaker unit (on a side of a rear portion of the speaker unit), and which second portion of the attaching member may have an opening. The attaching member may have a third portion on a sidewall side of the speaker unit and, instead of or in addition to the opening in the second portion, may have an opening in the third portion. In this mode, an opening is provided in at least one of the second portion and the third portion of the attaching member. As a result, even in a case in which the chassis that houses the speaker unit is distorted due to generation of sound, the pressure in a hollow between the chassis and the attaching member will not increase. Thus, unnecessary distortion in the attaching member can be minimized.

In a mode of the third aspect of the invention, the separating members are disposed between the first portion of the chassis and the first portion of the attaching member. In this mode, since the separating member is disposed on the same side as the sound emitting portion of the speaker unit, vibrations transmitted from the speaker unit are reduced effectively.

In a mode of the third aspect of the invention, the separating members are each a spring member, and the sound output device may further include another spring member that is provided between the chassis and the attaching member, the other spring member having a larger spring constant than the spring member. In this mode, even when an excessive acceleration is applied to the chassis, a vibration-caused collision between the chassis and the attaching member can be suppressed.

In a mode of the third aspect of the invention, the separating members may each be a non-linear spring member with a spring constant that increases with an increasing load. In this mode, when an excessive acceleration is applied to the chassis, the spring constant will increase before the chassis collides with the attaching member. Therefore, a collision between the chassis and the attaching member can be suppressed.

In a mode of the third aspect of the invention, the chassis does not need to have openings other than the opening in the first portion. In another mode, the chassis may have a second portion that is provided on a side opposite to the sound emitting portion of the speaker unit, and the second portion of the chassis may have an opening. In yet another mode, the chassis does not need to have a portion that is provided on a side opposite to the sound emitting portion of the speaker unit (the chassis does not need to have a second portion).

In a mode of the third aspect of the invention, in a central-axis direction of the speaker unit, neither the length of the chassis nor the length of the attaching member is greater than the length of the speaker unit. In this mode, in the central-axis direction of the speaker unit, the sound output device can have the same length as the speaker unit. Thus, compared with a sound output device with a chassis or an attaching member that is longer than a speaker unit, the sound output device according to this mode is reduced in size, assuming that the lengths of the speaker units of these sound output devices are the same.

In a mode of the third aspect of the invention, the chassis may have a second portion that is provided on a side opposite to the sound emitting portion of the speaker unit (on a side of the rear portion of the speaker unit), the attaching member may have a second portion that is provided on a side opposite to the sound emitting portion of the speaker unit, and the separating members may be disposed between the second portion of the chassis and the second portion of the attaching member. In another mode, the chassis may have a third portion on a sidewall side of the speaker unit, the attaching member may have a second portion that is provided on a side opposite to the sound emitting portion of the speaker unit, and the separating members may be disposed between the third portion of the chassis and the second portion of the attaching member.

In a mode of the third aspect of the invention, the sound output device may further include a sealing member that reduces transmission of a sound, wherein the sealing member is provided between the first portion of the chassis and the first portion of the attaching member. In this mode, a sound is reduced that is emitted from a side opposite to the sound emitting portion of the speaker unit (from the rear portion of the speaker unit), passes through the space between the chassis and the attaching member, and is then emitted to a side of the sound emitting portion of the speaker unit. In other words, the sneaking of the sound emitted from the rear portion of the speaker unit to the front is lessened.

DESCRIPTION OF REFERENCE SIGNS

1 . . . sound output device; 2 . . . outer box (attaching member); 2a . . . front board of the outer box (first portion of the attaching member); 2b . . . back board of the outer box (second portion of the attaching member); 2c . . . side board of the outer box (third portion of the attaching member); 3 . . . loudspeaker; 4 . . . microphone; 7 . . . object; 20, 21, 22 . . . opening; 23 . . . recessed portion; 24, 25, 26 . . . holding part; 30 . . . speaker unit; 30a . . . sound emitting portion of the speaker unit; 30b . . . rear portion of the speaker unit; 30c . . . sidewall of the speaker unit; 32 . . . inner box (chassis); 32a . . . front portion of the inner box (first portion of the chassis); 32b . . . back portion of the inner box (second portion of the chassis); 32c . . . side portion of the inner box (third portion of the chassis); 33, 34 . . . holding part; 35, 36 . . . opening; 50, 51 . . . vibration damper (separating member); 52 . . . vibration damper (another spring member); 53 . . . vibration damper (separating member); 60 . . . signal processing IC; 71 . . . frame; 71a . . . housing portion of the frame; 71b . . . tabular portion of the frame; 72 . . . opening; 73 . . . holding part; 80 . . . sealing member; 102 . . . tabular member (attaching member); 120 . . . opening; 301 . . . movable portion of the speaker unit; 302 . . . non-movable portion of the speaker unit; 303 . . . elastic member of the speaker unit; 401 . . . inner cylinder; 402 . . . outer cylinder; 501 . . . cylindrical portion.

What is claimed is:

1. A sound output device attachable to an object including a first opening that allows emission of sound, the sound output device comprising:

a speaker unit including a sound emitting portion;

an attaching member that is attachable to the object; and at least one separating member comprising a spring configured to absorb vibrations of the speaker unit, the at least one separating member being provided between the speaker unit and the attaching member to separate the speaker unit from the attaching member; and a sealing member comprising at least one of a rubber material, a grease material, or a sponge material disposed between the speaker unit and the attaching member to reduce sound emitted from a backside of the speaker unit, which is opposite the sound emitting portion, from being transmitted to a sound emitting portion side, wherein the attaching member includes a first portion on a side of the sound emitting portion of the speaker unit, wherein the first portion of the attaching member includes a second opening that corresponds to the sound emitting portion, wherein one end of the at least one separating member is attached to the speaker unit and the other end of the at least one separating member is attached to the attaching member, and wherein the first portion of the attaching member is configured to attach to the object, with the second opening aligned with the first opening to allow sound to emit to outside of the object through the second and first openings in this order in a state where the sound output device is attached to the object.

2. The sound output device according to claim 1, wherein the at least one separating member further reduces the sound emitted from the backside of the speaker unit from being transmitted to the sound emitting portion side.

3. The sound output device according to claim 1, wherein the object is a vehicle.

* * * * *